United States Patent
Foley

(10) Patent No.: US 12,493,554 B2
(45) Date of Patent: *Dec. 9, 2025

(54) PARALLEL PROCESSING USING HAZARD DETECTION AND MITIGATION

(71) Applicant: Ascenium, Inc., Mountain View, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/387,695

(22) Filed: Nov. 7, 2023

(65) Prior Publication Data

US 2024/0070076 A1     Feb. 29, 2024

Related U.S. Application Data

(63) Continuation-in-part of application No. 17/526,003, filed on Nov. 15, 2021, which is a
(Continued)

(51) Int. Cl.
    *G06F 12/0846*      (2016.01)
    *G06F 9/38*      (2018.01)

(52) U.S. Cl.
    CPC .......... *G06F 12/0846* (2013.01); *G06F 9/383* (2013.01)

(58) Field of Classification Search
    CPC .............................. G06F 12/0846; G06F 9/383
    See application file for complete search history.

(56) References Cited

U.S. PATENT DOCUMENTS

| | | |
|---|---|---|
| 5,594,884 A | 1/1997 | Matoba et al. |
| 5,764,994 A | 6/1998 | Craft |

(Continued)

FOREIGN PATENT DOCUMENTS

| | | |
|---|---|---|
| KR | 10-2015-0051083 A | 5/2015 |
| WO | WO2011038940 A1 | 4/2011 |
| WO | WO2020252763 A1 | 6/2019 |

OTHER PUBLICATIONS

Musicus, "The OKI Advanced Array Processor (AAP)—Development Software Manual, RLE Technical Report No. 539", Research Laboratory of Electronics, Massachusetts Institute of Technology, Dec. 1988, 270 pages (Year: 1988).*

(Continued)

*Primary Examiner* — Yaima Rigol
*Assistant Examiner* — Chen Gu
(74) *Attorney, Agent, or Firm* — Adams Intellex, PLC

(57) ABSTRACT

Techniques for parallel processing using hazard detection and mitigation are disclosed. An array of compute elements is accessed. Each compute element within the array of compute elements is known to a compiler and is coupled to its neighboring compute elements within the array of compute elements. Control for the compute elements is provided on a cycle-by-cycle basis. Control is enabled by a stream of wide control words generated by the compiler. Memory access operations are tagged with precedence information. The tagging is contained in the control words. The tagging is provided by the compiler at compile time. Memory access operations are monitored. The monitoring is based on the precedence information and a number of architectural cycles of the cycle-by-cycle basis. The tagging is augmented at run time, based on the monitoring. Memory access data is held before promotion, based on the monitoring.

25 Claims, 8 Drawing Sheets

Related U.S. Application Data continuation-in-part of application No. 17/465,949, filed on Sep. 3, 2021.

(60) Provisional application No. 63/536,144, filed on Sep. 1, 2023, provisional application No. 63/529,159, filed on Jul. 27, 2023, provisional application No. 63/460,909, filed on Apr. 21, 2023, provisional application No. 63/447,915, filed on Feb. 24, 2023, provisional application No. 63/442,131, filed on Jan. 31, 2023, provisional application No. 63/424,960, filed on Nov. 14, 2022, provisional application No. 63/424,961, filed on Nov. 14, 2022, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS

| | | | |
|---|---|---|---|
| 6,988,183 B1 * | 1/2006 | Wong | G06F 9/4552 712/E9.037 |
| 7,343,477 B1 * | 3/2008 | Thatipelli | G06F 9/3861 712/218 |
| 7,840,777 B2 | 11/2010 | Mykland | |
| 8,627,017 B2 | 1/2014 | Sheaffer et al. | |
| 8,677,081 B1 | 3/2014 | Wentzlaff et al. | |
| 8,694,978 B1 | 4/2014 | Rus et al. | |
| 8,856,768 B2 | 10/2014 | Mykland | |
| 8,869,123 B2 | 10/2014 | Mykland | |
| 8,949,806 B1 | 2/2015 | Lee et al. | |
| 9,158,544 B2 | 10/2015 | Mykland | |
| 9,304,770 B2 | 4/2016 | Mykland | |
| 9,395,992 B2 | 7/2016 | Doing et al. | |
| 9,424,055 B2 | 8/2016 | Lundvall et al. | |
| 9,473,155 B2 | 10/2016 | Staszewski et al. | |
| 9,477,470 B2 | 10/2016 | Mykland | |
| 9,529,715 B2 | 12/2016 | Kumar et al. | |
| 9,582,277 B2 | 2/2017 | Muff et al. | |
| 9,594,559 B2 | 3/2017 | Fontenot et al. | |
| 9,600,287 B2 | 3/2017 | Gschwind et al. | |
| 9,633,160 B2 | 4/2017 | Mykland | |
| 9,652,238 B2 | 5/2017 | Muff et al. | |
| 9,684,511 B2 | 6/2017 | Shanbhogue et al. | |
| 9,830,164 B2 | 11/2017 | Yazdani | |
| 9,851,969 B2 | 12/2017 | Greiner et al. | |
| 9,886,277 B2 | 2/2018 | Loktyukhin et al. | |
| 9,898,293 B2 | 2/2018 | Whittaker | |
| 9,921,836 B2 | 3/2018 | Kumar et al. | |
| 9,928,062 B2 | 3/2018 | Azagury et al. | |
| 9,934,040 B2 | 4/2018 | Bonanno et al. | |
| 9,946,547 B2 | 4/2018 | Yu et al. | |
| 9,971,605 B2 | 5/2018 | Henry et al. | |
| 9,977,674 B2 | 5/2018 | Rupley et al. | |
| 9,977,675 B2 | 5/2018 | Nystad | |
| 9,977,679 B2 | 5/2018 | Caulfield et al. | |
| 9,983,882 B2 | 5/2018 | Greiner et al. | |
| 9,983,884 B2 | 5/2018 | Maiyuran et al. | |
| 10,089,277 B2 | 10/2018 | Mykland | |
| 10,540,584 B2 | 1/2020 | McBride et al. | |
| 10,922,146 B1 | 2/2021 | Minkin et al. | |
| 11,163,486 B2 | 11/2021 | Bavishi et al. | |
| 2002/0174318 A1 | 11/2002 | Studdard et al. | |
| 2004/0111710 A1 | 6/2004 | Chakradhar et al. | |
| 2005/0125786 A1 * | 6/2005 | Dai | G06F 8/4451 717/161 |
| 2008/0288744 A1 * | 11/2008 | Gonion | G06F 9/30072 712/205 |
| 2008/0288745 A1 * | 11/2008 | Gonion | G06F 9/3838 712/205 |
| 2008/0288754 A1 * | 11/2008 | Gonion | G06F 9/383 712/217 |
| 2008/0288759 A1 * | 11/2008 | Gonion | G06F 9/30038 712/235 |
| 2011/0320883 A1 * | 12/2011 | Gonion | G06F 9/383 714/47.1 |
| 2013/0326190 A1 | 12/2013 | Chung et al. | |
| 2014/0149657 A1 | 5/2014 | Jakovljevic et al. | |
| 2014/0317383 A1 | 10/2014 | Park et al. | |
| 2015/0106597 A1 | 4/2015 | Godard et al. | |
| 2015/0186146 A1 | 7/2015 | Kushida et al. | |
| 2016/0246602 A1 | 8/2016 | Radhika et al. | |
| 2017/0083330 A1 * | 3/2017 | Burger | G06F 9/30043 |
| 2018/0225116 A1 | 8/2018 | Henry et al. | |
| 2018/0307980 A1 | 10/2018 | Barik et al. | |
| 2018/0322606 A1 | 11/2018 | Das et al. | |
| 2018/0341493 A1 | 11/2018 | Roy et al. | |
| 2018/0357172 A1 | 12/2018 | Lai | |
| 2019/0004777 A1 | 1/2019 | Meixner | |
| 2019/0347190 A1 | 11/2019 | Singh | |
| 2019/0369990 A1 | 12/2019 | Doerr et al. | |
| 2020/0026498 A1 | 1/2020 | Sumbul et al. | |
| 2020/0241879 A1 | 7/2020 | Vorbach et al. | |
| 2022/0050624 A1 | 2/2022 | Bavishi et al. | |
| 2022/0075651 A1 | 3/2022 | Harboe et al. | |

OTHER PUBLICATIONS

International Search Report dated Feb. 28, 2024 for PCT/US2023/036949.

Chang, Kyungwook, and Kiyoung Choi. "Mapping control intensive kernels onto coarse-grained reconfigurable array architecture." 2008 International SoC Design Conference. vol. 1. IEEE, 2008.

Musicus, B. R. (1988). The OKI advanced array processor (AAP): Development Software Manual.

* cited by examiner

PARALLEL PROCESSING USING HAZARD DETECTION AND MITIGATION

RELATED APPLICATIONS

This application claims the benefit of U.S. provisional patent applications "Parallel Processing Using Hazard Detection And Mitigation" Ser. No. 63/424,960, filed Nov. 14, 2022, "Parallel Processing With Switch Block Execution" Ser. No. 63/424,961, filed Nov. 14, 2022, "Parallel Processing With Hazard Detection And Store Probes" Ser. No. 63/442,131, filed Jan. 31, 2023, "Parallel Processing Architecture For Branch Path Suppression" Ser. No. 63/447,915, filed Feb. 24, 2023, "Parallel Processing Hazard Mitigation Avoidance" Ser. No. 63/460,909, filed Apr. 21, 2023, "Parallel Processing Architecture With Block Move Support" Ser. No. 63/529,159, filed Jul. 27, 2023, and "Parallel Processing Architecture With Block Move Backpressure" Ser. No. 63/536,144, filed Sep. 1, 2023.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to parallel processing and more particularly to parallel processing using hazard detection and mitigation.

BACKGROUND

Data is widely considered one of the most highly valued and closely guarded assets of any organization. The large sets of data or "datasets" that are collected are often sparse and unstructured. The datasets are processed to achieve the objectives of organizations, that include commercial, educational, governmental, medical, research, or retail ones, among many others. Data analysis further includes forensic and law enforcement purposes. The computational resources that are used to process data are vast, highly complex, and extremely expensive. These resources include processors, data storage units, networking and communications equipment, telephony, power conditioning units, HVAC equipment, and backup power units, among other essential equipment. Further, energy resource management is critical to handling vast energy consumption requirements and to removing prodigious heat. The computational resources are typically located in special-purpose, high security, installations that more closely resemble high-security sites or even vaults than traditional office buildings. Not every organization requires vast computational equipment installations to meet objectives. However, all strive to provide resources to process data as quickly and cost effectively as possible.

Data operations include executing a wide variety of data processing jobs. The jobs include operating manufacturing facilities, controlling experiments, analyzing research data, performing billing and payroll, generating profit and loss statements, processing tax returns or election results, and generating academic grades, among others. The jobs consume computational resources in installations that typically operate 24×7×365. The organizational missions dictate the types of data processed and the jobs used to process the data. These processing jobs must be executed quickly, accurately, and cost-effectively. The processed datasets can be very large and unstructured, thereby overwhelming conventional computational resources. Processing an entire dataset may be required to find a particular data element. Effective dataset processing supports client identification, or production and distribution systems finetuning, among other results that provide competitive advantages to the organization. Ineffective processing wastes money by missing opportunities or worse.

Data is collected by an extensive range of legitimate and illegitimate organizations that implement various data collection techniques. The most useful data is collected from varied and diverse categories of individuals. Legitimate data collection techniques include "opt-in" strategies, where an individual signs up, creates an account, registers, or otherwise actively and knowingly agrees to participate in the data collection. Some collection techniques are legislative, where citizens are required by law to obtain a registration number to interact with government agencies, law enforcement, emergency services, and others. Other techniques are surreptitious, where the individuals are unwitting subjects of data collection. Such data collection techniques are at most subtle or are even completely hidden, such as tracking purchase histories, website visits to various websites, button clicks, and menu choices. Data can and has been collected by theft. However it is obtained, the collected data is highly valuable to the organizations if processed rapidly and accurately.

SUMMARY

Datasets of vast dimensions are processed by organizations in support of critical organizational goals, missions, and objectives. The dataset processing is accomplished by submitting "processing jobs", where the processing jobs load data from storage, manipulate the data using processors, and store the data, among many other operations. The processing jobs that are performed are often critical to organizational survival. Typical data processing jobs include generating invoices for accounts receivable; processing payments for accounts payable; running payroll for full time, part time, and contract employees; analyzing research data; or training a neural network for machine learning. These processing jobs are highly complex and involve many data handling tasks. The tasks can include loading and storing various datasets, accessing processing elements and systems, executing data processing on the processing elements and systems, and so on. The tasks themselves include multiple steps or subtasks, which themselves can be highly complex. The subtasks can be used to handle specific jobs such as loading or reading certain datasets from storage, performing arithmetic and logical computations and other data manipulations, storing or writing the data back to storage, handling inter-subtask communication such as data transfers and control, and so on. The datasets that are accessed are vast and can easily overwhelm processing architectures that are either ill suited to the processing tasks or based on inflexible architectures. Instead, arrays of elements can be used for processing the tasks and subtasks, thereby significantly improving task processing efficiency and throughput. The arrays include compute elements, multiplier elements, registers, caches, buffers, controllers, decompressors, arithmetic logic units (ALUs), storage elements, and other components which can communicate among themselves.

The array of elements is configured and operated by providing control to the array of elements on a cycle-by-cycle basis. The control of the array is accomplished by providing control words generated by a compiler. The control words comprise operations that are executed by the elements within the array. The control includes a stream of control words, where the control words can include wide control words generated by the compiler. The control words are used to configure the array, to control the flow or transfer of data, and to manage the processing of the tasks and subtasks. The compiler provides static scheduling for the array of compute elements in order to configure the array. Further, the arrays can be configured in a topology which is best suited to the task processing. The topologies into which the arrays can be configured include a systolic, a vector, a cyclic, a spatial, a streaming, or a Very Long Instruction Word (VLIW) topology, among others. The topologies can include a topology that enables machine learning functionality. The control words can be compressed to reduce control word storage requirements. Memory access operations associated with the control words are tagged with precedence information. The tagging is contained in the control words, and the tagging is provided by the compiler at compile time. Memory access operations are monitored based on the precedence information and a number of architectural cycles of the cycle-by-cycle basis. The monitoring is performed to track progress of memory access operations, because memory access time is unknown to the compiler. Further, the time to transfer the data, where the transfer can include data transiting a crossbar switch, is also unknown to the compiler. The tagging is augmented at run time, based on the monitoring. The data that is accessed can be held in access buffers prior to promotion, based on the monitoring. The holding enables the identifying of hazardous loads and stores by comparing load and store addresses to contents of the access buffer.

Parallel processing is accomplished based on parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

A processor-implemented method for parallel processing is disclosed comprising: accessing an array of compute elements, wherein each compute element within the array of compute elements is known to a compiler and is coupled to its neighboring compute elements within the array of compute elements; providing control for the compute elements on a cycle-by-cycle basis, wherein control is enabled by a stream of wide control words generated by the compiler; tagging memory access operations with precedence information, wherein the tagging is contained in the control words, and wherein the tagging is provided by the compiler at compile time; monitoring memory access operations, wherein the monitoring is based on the precedence information and a number of architectural cycles of the cycle-by-cycle basis; and holding memory access data before promotion, based on the monitoring. Some embodiments comprise augmenting the tagging at run time, based on the monitoring. In embodiments, the holding is accomplished using access buffers coupled to a memory cache.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
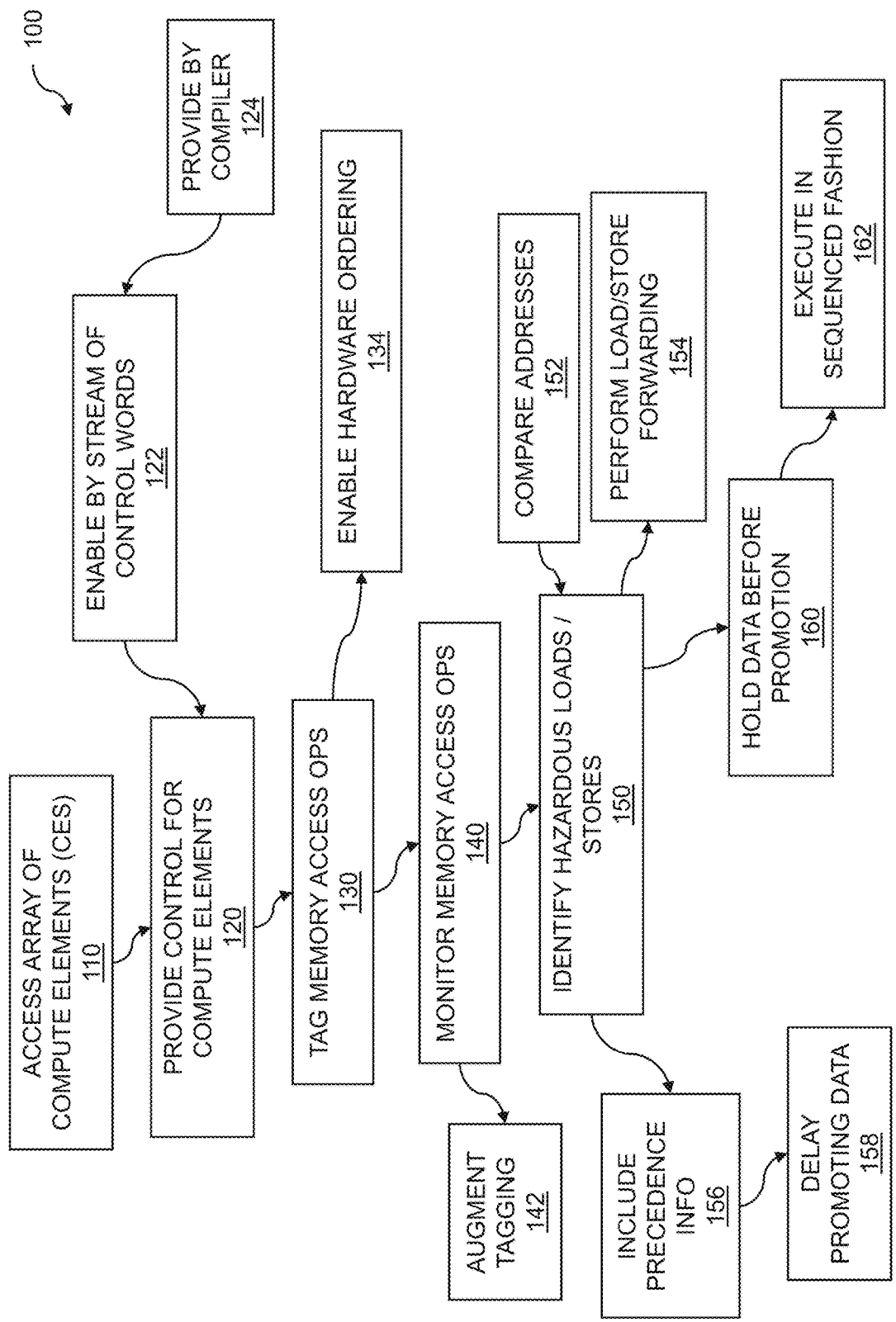
FIG. 1 is a flow diagram for parallel processing using hazard detection and mitigation.

Techniques for parallel processing using hazard detection and mitigation are disclosed. A hazard occurs when a load operation and a store operation attempt to access the same memory address at substantially the same time. While load operations that access the same address can be allowed because the contents at the location remain unchanged, load operations and store operations that attempt the access the same address at substantially the same time create a race condition or hazard. Depending on the execution order of the load and store operations at the same memory address, valid data may be overwritten before it can be loaded, old or invalid data may be loaded before the new data can be written, and so on. These critical timing issues can be difficult for a compiler to control at compile time because the processing speed of the array is dependent upon the numbers of tasks, subtasks, etc. that are executing at a given time, such as within a cycle. Execution of memory access operations is further dependent on an amount of data that is in transit between storage and compute elements, etc. These difficulties arise because operation execution times and memory access operation speeds are variable and therefore unknowable to the compiler at compile time. Instead, the compiler can provide precedence information which can be used to detect hazards, and to hold or delay data promotion (e.g., load, store, and transfer operations), thereby mitigating the detected hazard.

Wide control words that are generated by a compiler are provided by a compiler to the array. The wide control words are used to control elements within an array of compute elements on a cycle-by-cycle basis. The wide control words contain tagging information that is used to tag memory access operations performed by operations associated with the control words. The tagging is provided by the compiler at compile time. The memory access operations can be monitored. The monitoring can be accomplished using a control element associated with the array of compute elements. The monitoring the memory access operations is based on two factors. The factors can include the precedence information and a number of architectural cycles of the cycle-by-cycle basis. The monitoring enables the holding of memory access data before the memory access data is promoted. Data promotion can include storing the data to memory, loading the data into the array, etc.

In order for tasks, subtasks, and so on to execute properly, particularly in a statically scheduled architecture such as an array of compute elements, one or more operations associated with the plurality of wide control words must be executed in a semantically correct operations order. That is, the memory access load and store operations occur in an order that supports the execution of the tasks, subtasks, and so on. If the memory load and store operations do not occur in the proper order, then invalid data is loaded, stored, or processed. Another consequence of "out of order" memory access load and store operations is that the execution of the tasks, subtasks, etc., must be halted or suspended until valid data is available, thus increasing execution time. The tagging of the memory access operations discussed above enables hardware ordering of memory access loads to the array of compute elements and memory access stores from the array of compute elements. That is, the loads and stores can be controlled locally, in hardware, by one or more control elements associated with or within the array of compute elements. The controlling in hardware is accomplished without compiler involvement beyond the compiler providing the plurality of control words that include precedence information. The precedence information includes intra-control word precedence and/or inter-control word precedence. The intra-control word precedence and/or inter-control word precedence can be used to locally schedule and control the memory access operations.

The loading data from memory includes accessing an address within memory and loading the contents into a load buffer, prior to loading the data for one or more compute elements within the array. Similarly, storing data to memory includes placing the store data into an access buffer, prior to storing the data to an address within the memory. The load buffer and the access buffer can be used to hold data prior to loading into the array or storing into memory, respectively. The load buffer and the store buffer can accumulate data, retime loading data and storing data transfers, and so on. Since the load operations and the store operations access one or more addresses in the memory, hazards can be identified by comparing load and store addresses. The identifying hazards can be based on memory access hazard conditions that include write-after-read, read-after-write, and write-after-write conflicts. Since the memory access data is stored in access buffers prior to being released or promoted to the memory, the identifying hazardous loads and stores can be accomplished by comparing load and store addresses to contents of an access buffer. The comparing can further include the precedence information. The hazards can be avoided by delaying the promoting of data to the access buffer and/or releasing data from the access buffer. The delaying can be based on one or more cycles. The identifying a hazard enables hazard mitigation. Since the load data or store data requested by a memory access operation may still reside in the access buffer, the requested data can be accessed in the access buffer using a forwarding technique. Thus, the hazard mitigation can include load-to-store forwarding, store-to-load forwarding, and store-to-store forwarding.

Data manipulations are performed on an array of compute elements. The compute elements within the array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage which can include local memory elements, register files, scratchpad storage, cache storage, etc. The scratchpad storage can serve as a "level 0" (L0) cache. The cache, which can include a hierarchical cache such as a level 1 (L1), a level 2 (L2), and a level 3 (L3) cache working together, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a compiler. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of wide control words on a cycle-by-cycle basis, where one or more control words are generated by the compiler. The control words can include wide microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. The compiled microcode control words associated with the compute elements are distributed to the compute elements. The compute elements are controlled by a control unit which decompresses the control words. The decompressed control words enable processing by the compute elements. The task processing is enabled by executing the one or more control words. In order to accelerate the execution of tasks, to reduce or eliminate stalling for the array of compute elements, and so on, copies of data can be broadcast to a plurality of physical register files comprising 2R1W memory elements. The register files can be distributed across the 2D array of compute elements.

Parallel processing is accomplished using hazard detection and mitigation techniques. The task processing can include data manipulation. An array of compute elements is accessed. The compute elements can include computation elements, processors, or cores within an integrated circuit; processors or cores within an application specific integrated circuit (ASIC); cores programmed within a programmable device such as a field programmable gate array (FPGA); and so on. The compute elements can include homogeneous or heterogeneous processors. Each compute element within the array of compute elements is known to a compiler. The compiler, which can include a general-purpose compiler, a hardware-oriented compiler, or a compiler specific to the compute elements, can compile code for execution on the compute elements. Each compute element is coupled to its neighboring compute elements within the array of compute elements. The coupling of the compute elements enables data communication between and among compute elements. Thus, the compiler can control data flow between and among the compute elements and can also control data commitment to memory outside of the array.

Control for the compute elements is provided on a cycle-by-cycle basis. A cycle can include a clock cycle, an architectural cycle, a system cycle, etc. The control is enabled by a stream of wide control words generated by the compiler. The control words can configure compute elements within an array of compute elements. The control words can include one or more operations that can be executed by the compute elements, where the operations can include memory access operations. The memory access operations can be tagged with precedence information. The tagging is contained in the control words, and the tagging is provided by the compiler at compile time. The stream of wide control words generated by the compiler provides direct, fine-grained control of the array of compute elements. The fine-grained control can include control of individual compute elements, memory elements, control elements, etc. The memory store access operations can be further tagged with a unique precedence tag. The unique precedence tag can be based on a "cycle count" during which the memory store operation needs to occur. The precedence information enables hardware ordering of memory access loads to the array of compute elements and memory access stores from the array of compute elements. The ordering can take into account memory access delays, data transfer times, and so on that are unknown to the compiler at compile time. The precedence information provides semantically correct operation ordering. The semantically correct operation ordering enables successful execution of operations associated with tasks and subtasks. The memory access operations are monitored, wherein the monitoring is based on the precedence information and a number of architectural cycles of the cycle-by-cycle basis. The monitoring can be used to determine whether valid data is available for loading or storing during a given cycle. If the data is not available during the cycle or might be overwritten during the cycle, then an access hazard can occur. Memory access data can be held before promotion, based on the monitoring. The holding can be used to mitigate hazards such as write-after-read, read-after-write, and write-after-write conflicts.

FIG. 1 is a flow diagram for parallel processing using hazard detection and mitigation. Groupings of compute elements (CEs), such as CEs assembled within an array of CEs, can be configured to execute a variety of operations associated with data processing. The operations can be based on tasks, and on subtasks that are associated with the tasks. The array can further interface with other elements such as controllers, storage elements, ALUs, memory management units (MMUs), GPUs, multiplier elements, and so on. The operations can accomplish a variety of processing objectives such as application processing, data manipulation, data analysis, and so on. The operations can manipulate a variety of data types including integer, real, floating-point, and character data types; vectors and matrices; tensors; etc. Control is provided to the array of compute elements on a cycle-by-cycle basis, where the control is based on wide control words generated by a compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence data provision and compute element results. The control enables execution of a compiled program on the array of compute elements.

The flow 100 includes accessing an array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be colocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology. In embodiments, the array of compute elements can include a two-dimensional (2D) array of compute elements. More than one 2D array of compute elements can be accessed. Two or more arrays of compute elements can be colocated on an integrated circuit or chip, on multiple chips, and the like. In embodiments, two or more arrays of compute elements can be stacked to form a three-dimensional (3D) array. The stacking of the arrays of compute elements can be accomplished using a variety of techniques. In embodiments, the three-dimensional (3D) array can be physically stacked. The 3D array can comprise a 3D integrated circuit. In other embodiments, the three-dimensional array is logically stacked. The logical stacking can include configuring two or more arrays of compute elements to operate as if they were physically stacked.

The compute elements can further include a topology suited to machine learning computation. A topology for machine learning can include supervised learning, unsupervised learning, reinforcement learning, and other machine learning topologies. A topology for machine learning can include an artificial neural network topology. The compute elements can be coupled to other elements within the array of CEs. In embodiments, the coupling of the compute elements can enable one or more further topologies. The other elements to which the CEs can be coupled can include storage elements such as a scratchpad memory, one or more levels of cache storage, control units, multiplier units, address generator units for generating load (LD) and store (ST) addresses, buffers, register files, and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of array elements such as cache elements, multiplier elements, ALU elements, or control elements; communication between or among neighboring CEs; and the like.

The flow 100 includes providing control 120 for the compute elements on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In the flow 100, the control is enabled by a stream of control words 122 generated and provided by the compiler 124. The control words can include microcode control words, compressed control words, encoded control words, and the like. The "wideness" or width of the control words allows a plurality of compute elements within the array of compute elements to be controlled by a single wide control word. For example, an entire row of compute elements can be controlled by that wide control word. In embodiments, the stream of wide control words can include variable length control words generated by the compiler. The control words can be decompressed, used, etc., to configure the compute elements and other elements within the array; to enable or disable individual compute elements, rows and/or columns of compute elements; to load and store data; to route data to, from, and among compute elements; and so on. In other embodiments, the stream of wide control words generated by the compiler can provide direct, fine-grained control of the array of compute elements. The fine-grained control of the compute elements can include enabling or idling individual compute elements; enabling or idling rows or columns of compute elements; etc.

Data processing that can be performed by the array of compute elements can be accomplished by executing tasks, subtasks, and so on. The tasks and subtasks can be represented by control words, where the control words configure and control compute elements within the array of compute elements. The control words comprise one or more operations, where the operations can include data load and store operations; data manipulation operations such as arithmetic, logical, matrix, and tensor operations; and so on. The control words can be compressed by the compiler, by a compressor, and the like. The plurality of wide control words enables compute element operations. Compute element operations can include arithmetic operations such as addition, subtraction, multiplication, and division; logical operations such as AND, OR, NAND, NOR, XOR, XNOR, and NOT; matrix operations such as dot product and cross product operations; tensor operations such as tensor product, inner tensor product, and outer tensor product; etc. The control words can comprise one or more fields. The fields can include one or more of an operation, a tag, data, and so on. In embodiments, a field of a control word in the plurality of control words can signify a "repeat last operation" control word. The repeat last operation control word can include a number of operations to repeat, a number of times to repeat the operations, etc. The plurality of control words enables compute element memory access. Memory access can include access to local storage such as one or more register files or scratchpad storage, memory coupled to a compute element, storage shared by two or more compute elements, cache memory such as level 1 (L1), level 2 (L2), and level 3 (L3) cache memory, a memory system, etc. The memory access can include loading data, storing data, and the like.

In embodiments, the array of compute elements can be controlled on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In embodiments, the stream of control words can include compressed control words, variable length control words, etc. The control words can further include wide compressed control words. The control words can be provided as a stream of control words to the array. The control words can include microcode control words, compressed control words, encoded control words, and the like. The width of the control words allows a plurality of compute elements within the array of compute elements to be controlled by a single wide control word. For example, an entire row of compute elements can be controlled by that wide control word. The control words can be decompressed, used, etc., to configure the compute elements and other elements within the array; to enable or disable individual compute elements, rows and/or columns of compute elements; to load and store data; to route data to, from, and among compute elements; and so on.

Various types of compilers can be used to generate the stream of wide control words. The compiler which generates the wide control words can include a general-purpose compiler such as a C, C++, Java, or Python compiler; a hardware description language compiler such as a VHDL or Verilog compiler; a compiler written for the array of compute elements; and the like. In embodiments, the control words comprise compressed control words, variable length control words, and the like. In embodiments, the stream of control words generated by the compiler can provide direct fine-grained control of the 2D array of compute elements. The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers, where the layers can include one or more of input layers, hidden layers, output layers, and the like. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data and no control word. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task.

The stream of wide control words that is generated by the compiler can include a conditionality such as a branch. The branch can include a conditional branch, an unconditional branch, etc. Compressed control words can be decompressed by a decompressor logic block that decompresses words from a compressed control word cache on their way to the array. In embodiments, a set of operations associated with one or more compressed control words can include a spatial allocation of subtasks on one or more compute elements within the array of compute elements. In other embodiments, the set of operations can enable multiple, simultaneous programming loop instances circulating within the array of compute elements. The multiple programming loop instances can include multiple instances of the same programming loop, multiple programming loops, etc.

The flow 100 includes tagging memory access operations 130 with precedence information, wherein the tagging is contained in the control words provided by the compiler. The tagging can include a fixed number of bits, bytes, etc. within a control word. The bits can comprise a field within the control word. The tagging field can include a variable number of bits, where the number of bits can be based on a control word, a compressed control word, etc. In embodiments, the precedence information can include intra-control word precedence and/or inter-control word precedence. The precedence information associated with the tagging can include a priority, dependencies within a control word (intra-control word), dependencies between control words (inter-control words), and the like. The tagging can include an execution order. The execution can be associated with operations such as memory access operations associated with the stream of control words. The tagging can be provided by the compiler at compile time. Recall that the compiler generates the stream of wide control words. The control words configure the array of compute elements to execute tasks and subtasks. The compiler takes into account inputs to a given task; subtasks, if any, associated with the tasks; etc. The compiler further considers execution order of tasks and subtasks, data and control dependencies between tasks and between subtasks, branches within the code and so on. The compiler then generates the stream of wide control words based on the execution orders, data dependencies, etc.

The precedence information generated by the compiler at compile time is critical to proper processing of tasks and subtasks. The precedence information can describe load operations and store operations that access memory such as a memory cache. In embodiments, the memory cache can include a data cache for the array of compute elements. As operations associated with the tasks and subtasks are executed, memory access times can vary depending on the number of memory access operations which are requested in a given cycle, amounts of data loaded and stored, and so on. In embodiments, the memory cache can have an access time that is unknown to the compiler. Discussed throughout, data memory access can transit a switch such as crossbar switch as data is transferred among the cache memory, buffers such as access buffers and load buffers, and the array of compute elements. In embodiments, a delay for the transferring data through the crossbar switch is unknown to the compiler. In the flow 100, the precedence information enables hardware ordering 134 of memory access loads to the array of compute elements and memory access stores from the array of compute elements. The hardware ordering can order execution of memory access operations such as memory load and store operations based on the memory access times and the crossbar switch transit times that occur within cycles of the cycle-by-cycle basis.

The flow 100 includes monitoring 140 memory access operations, wherein the monitoring is based on the precedence information and a number of architectural cycles of the cycle-by-cycle basis. The monitoring can track task execution and subtask execution on the array of compute elements. The monitoring can include tracking memory access operations requested by operations associated with the stream of control words. The monitoring can track where operations such as memory access operations occur with a given cycle, a number of cycles, and the like. Since the monitoring takes place while operations associated with control words are executed on the array of compute elements, the monitoring can detect varying memory access times, crossbar switch transit times, etc. The flow 100 further includes augmenting the tagging 142 at run time, based on the monitoring. The augmenting the tagging can include adding information to the precedence information, where the added information can account for cycle-based memory access times, crossbar switch transit delay times, etc. Embodiments can include tagging store accesses with a unique precedence tag, or code. The unique precedence code can be based on a cycle number, a number of cycles within which an operation such as a memory access operation must complete, and so on. In embodiments, the unique precedence tag can enable load access priority in the crossbar switch. The unique precedence code can be prepended to the precedence information provided by the compiler. The unique precedence code and the precedence information can form a tuple.

The flow 100 further includes identifying 150 hazardous loads and stores. A hazard such as a memory load hazard or a memory access store hazard can occur when two or more memory access operations attempt to access the same memory address at substantially the same time. The order in which the load and store operations are performed, such as load before store, or store before load, determines whether valid data or invalid data is accessed. While multiple load operations accessing the same memory address can be allowed, a load and a store accessing the same memory address at substantially the same time causes a race condition or a hazard. The hazard occurs because the load operation may be too late to read valid data and may in fact read newer data that overwrote the requested data. Similarly, a store operation may store data too late for the load operation that loaded old, invalid data. In embodiments, the hazards include write-after-read, read-after-write, and write-after-write conflicts.

The flow 100 includes comparing 152 load and store addresses to contents of an access buffer. The access buffer can be coupled to a cache memory such as the data cache memory. In embodiments, the comparing can identify potential accesses to the same address. The access buffer holds data prior to the data being stored in the data cache memory. Since the data requested by a memory access load operation may not yet have been written or stored into the cache memory, then a search of the access buffer may yield the data requested by the load operation. In embodiments, the access buffer can be searched based on the contents of the access buffer (e.g., a content addressable memory technique). The flow 100 includes performing load/store forwarding 154. The load/store forwarding can provide data to a load request from the access buffer rather than from the cache memory since the data in the cache memory has yet to be updated. In embodiments, the identifying enables hazard mitigation. The identifying can include identifying load hazards and store hazards. In embodiments, the hazard mitigation includes load-to-store forwarding, store-to-load forwarding, and store-to-store forwarding.

The flow 100 further comprises including the precedence information 156 in the comparing. The precedence information can include the precedence information generated by the compiler at compile time. The precedence information can further include the unique precedence tag. The including the precedence information can enable the hazard detection based on an order of operation, a number of cycles within which a memory access operation must complete, and the like. The flow 100 further includes delaying the promoting of data 158 to the access buffer and/or releasing data from the access buffer. The delaying can be based on a number of cycles, an amount of time, a window associated with a number of cycles, etc. The delaying can be used to accommodate the varying cache memory access times and the varying crossbar switch transit times. Recall that the memory access times can depend on a number of memory access operations and an amount of data accessed within a given cycle. Further recall that the crossbar switch transit times can vary based on an amount of data transiting the crossbar switch within a given period. In embodiments, the delaying can avoid hazards. The hazards that can be avoided can include write-after-read, read-after-write, and write-after-write conflicts. In embodiments, the avoiding hazards is based on a comparative precedence value. Memory access operations associated with higher precedence values can be given higher priority than memory access operations with lower precedence values, etc.

The flow 100 includes holding memory access data 160 before promotion, based on the monitoring. The holding can be based on retaining store data in storage within the array of compute elements. The holding can be based on an amount of time, a number of cycles, and so on. The holding can be based on the precedence information. The holding can be accomplished using other storage such as a scratchpad memory. In embodiments, the holding can be accomplished using access buffers coupled to a memory cache. Discussed previously and throughout, the access buffers can be coupled to a memory cache such as a data memory cache. Data produced by operations executing on the array of compute elements can transfer the data to the access buffers. In embodiments, the transferring can be accomplished using a crossbar switch. In embodiments, the holding can prevent premature data promotion into or out of the memory cache. Premature data promotion can cause any of the hazards described previously. The premature data promotion can cause data to arrive too early or data to arrive too late, thereby resulting in hazards such as write-after-read, read-after-write, and write-after-write hazards.

The flow 100 includes executing operations in sequential, or sequenced, fashion 162. The operations can include arithmetic, logic, matrix, tensor, and other data manipulation operations. The operations can further include memory access operations. The operations can be associated with control words within the stream of wide control words generated by the compiler. In embodiments, the precedence information provides semantically correct operation ordering. The semantically correct operation ordering can include executing independent operations in parallel. Execution of dependent operations can include executing operations in series, executing operations in a combination of parallel and series operations, etc.

Further embodiments include decompressing a stream of compressed control words. The decompressed control words can comprise one or more operations, where the operations can be executed by one or more compute elements within the array of compute elements. The decompressing the compressed control words can be accomplished using a decompressor element. The decompressor element can be coupled to the array of compute elements. In embodiments, the decompressing by a decompressor operates on compressed control words that can be ordered before they are presented to the array of compute elements. The presented compressed control words that were decompressed can be executed by one or more compute elements. Further embodiments include executing operations within the array of compute elements using the plurality of compressed control words that were decompressed. The executing operations can include configuring compute elements, loading data, processing data, storing data, generating control signals, and so on. The executing the operations within the array can be accomplished using a variety of processing techniques such as sequential execution techniques, parallel processing techniques, etc.

The control words that are generated by the compiler can include a conditionality. In embodiments, the control words include branch operations. Code, which can include code associated with an application such as image processing, audio processing, and so on, can include conditions which can cause execution of a sequence of code to transfer to a different sequence of code. The conditionality can be based on evaluating an expression such as a Boolean or arithmetic expression. In embodiments, the conditionality can determine code jumps. The code jumps can include conditional jumps as just described, or unconditional jumps such as a jump to halt, exit, or terminate an instruction. The conditionality can be determined within the array of elements. In embodiments, the conditionality can be established by a control unit. In order to establish conditionality by the control unit, the control unit can operate on a control word provided to the control unit. Further embodiments include suppressing memory access stores for untaken branch paths. In parallel processing techniques, each path or side of a conditionality such as a branch can begin execution prior to the evaluating the conditionality that will decide which path to take. Once the conditionality has been decided, execution of operations associated with the taken path or side can continue. Operations associated with the untaken path can be suspended. Thus, any memory access stores associated with the untaken path can be suppressed because they are no longer relevant. In embodiments, the control unit can operate on decompressed control words. The control words can be decompressed by a decompressor logic block that decompresses words from a compressed control word cache on their way to the array. In embodiments, the set of directions can include a spatial allocation of subtasks on one or more compute elements within the array of compute elements.

The operations that are executed by the compute elements within the array can include arithmetic operations, logical operations, matrix operations, tensor operations, and so on. The operations that are executed are contained in the control words. Discussed above, the control words can include a stream of wide control words generated by the compiler. The control words can be used to control the array of compute elements on a cycle-by-cycle basis. A cycle can include a local clock cycle, a self-timed cycle, a system cycle, and the like. In embodiments, the executing occurs on an architectural cycle basis. An architectural cycle can include a read-modify-write cycle. In embodiments, the architectural cycle basis reflects non-wall clock, compiler time. The execution can include distributed execution of operations. In embodiments, the distributed execution of operations can occur in two or more compute elements within the array of compute elements, within a grouping of compute elements, and so on. The compute elements can include independent or individual compute elements, clustered compute elements, etc. Execution of specific compute element operations can enable parallel operation processing. The parallel operation processing can include processing nodes of a graph that are independent of each other, processing independent tasks and subtasks, etc. The operations can include arithmetic, logic, array, matrix, tensor, and other operations. A given compute element can be enabled for operation execution, idled for a number of cycles when the compute element is not needed, etc. The operations that are executed can be repeated. An operation can be based on a plurality of control words.

The operation that is being executed can include data dependent operations. In embodiments, the plurality of control words includes two or more data dependent branch operations. The branch operation can include two or more branches, where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In order to expedite execution of a branch operation, sides of the branch can be precomputed prior to datum A and datum B being available. When the data is available, the expression can be computed, and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the generating, the customizing, and the executing can enable background memory access. The background memory access can enable a control element to access memory independently of other compute elements, a controller, etc. In embodiments, the background memory access can reduce load latency. Load latency is reduced since a compute element can access memory before the compute element exhausts the data that the compute element is processing.

The array of compute elements can accomplish autonomous operation. The autonomous operation can be based on a buffer such as an autonomous operation buffer that can be loaded with an instruction that can be executed using a "fire and forget" technique, where instructions are loaded in the autonomous operation buffer and the instructions can be executed without further supervision by a control word. The autonomous operation of the compute element can be based on operational looping, where the operational looping is enabled without additional control word loading. The looping can be enabled based on ordering memory access operations such that memory access hazards are avoided. Note that latency associated with access by a compute element to storage can be significant and can cause operation of the compute element to stall. A compute element operation counter can be coupled to the autonomous operation buffer. The compute element operation counter can be used to control a number of times that the instructions within the autonomous operation buffer are cycled through. The compute element operation counter can be used to indicate or "point to" the next instruction to be provided to a compute element, a multiplier element, and ALU, or another element within the array of compute elements. In embodiments, the autonomous operation buffer and the compute element operation counter enable compute element operation execution. The compute element operation execution can include executing one or more instructions, looping executions, and the like. In embodiments, the compute element operation execution involves operations not explicitly specified in a control word. Operations not explicitly specified in a control word can include low level operations within the array of compute elements such as data transfer protocols, execution completion and other signal generation techniques, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
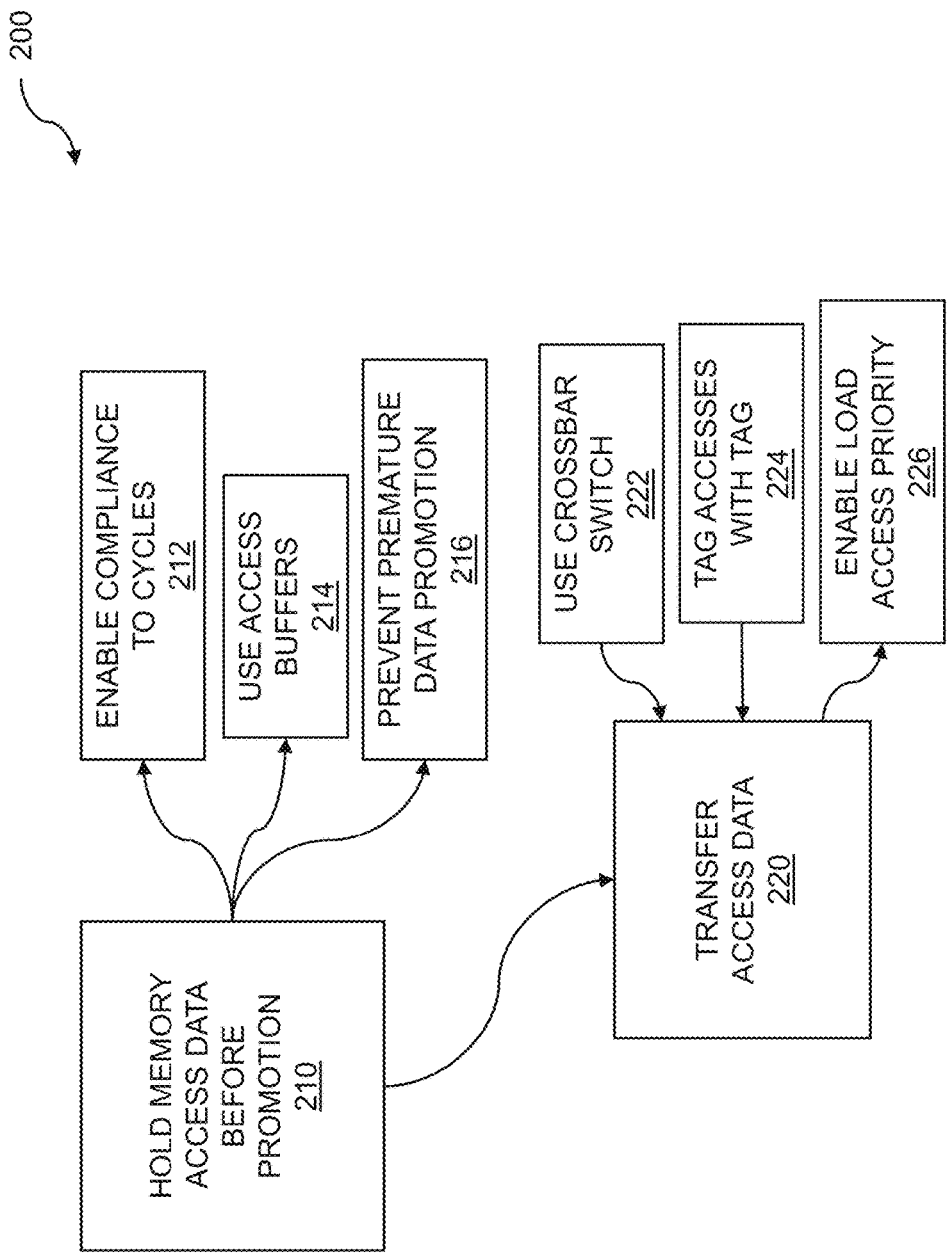
FIG. 2 is a flow diagram for memory access data holding.

FIG. 2 is a flow diagram for memory access data holding. Operations executed on an array such as an array of compute elements can include read-modify-write operations. These operations access memory to load data, manipulate the data, and store the manipulated data back to memory. The array of compute elements that perform the operations can be controlled using one or more control words. The control words can be generated by a compiler and can be used to configure or schedule one or more compute elements within the array. The compute elements that are scheduled can perform operations such as arithmetic, logic, matrix, or tensor operations; access various storage or memory elements; and so on. The control words can include wide control words. The wide control words can include fixed-length control words, variable length control words, etc. In order for the control words to be provided to and stored more efficiently in the array, the control words can be compressed. The compressing of the control words can be accomplished by the compiler. The compressed control words can be stored more efficiently since the compressed words can be shorter than the uncompressed control words. Since the order of memory access operations is critical to successfully executing tasks, subtasks, and so on, the memory access operations can be tagged with precedence information. The precedence information can include a memory access order, priority, etc. The tagging can be contained in the control words and can be provided by the compiler at compile time. The memory access operations, including load and store operations, can be monitored based on the precedence information provided by the compiler. The monitoring can also be based on a number of architectural cycles of the cycle-by-cycle basis. Memory access data holding techniques can be used to hold the data prior to promoting the data. The holding data can prevent memory access hazards such as an attempt to load and store data to the same address at substantially the same time. The tagging and monitoring enable parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

The flow 200 includes holding 210 memory access data before promotion, based on the monitoring. The holding can be based on a priority or order of memory access operations. The holding can be based on an amount of time, a time window, and so on. In embodiments, the holding can be based on the precedence information provided by the compiler at compiler time. The precedence information can include data dependencies between compute element operations, data load and data store orders, and the like. In embodiments, the holding can be based on the monitoring of memory access operations. In embodiments, the memory cache can include a data cache for the array of compute elements. The memory that is accessed can include a cache such as a data cache. The monitoring the memory access operations is critical because an amount of time or number of cycles required to perform a memory access operation is dependent on tasks and subtasks executing on the compute element array during a given cycle. Further, data that is loaded from or stored to the memory can transit a switch, such as a crossbar switch, as part of accessing data during the memory address operation. The time to transit the crossbar switch is also dependent on an amount of data transiting the crossbar switch at a given time. In embodiments, the memory cache has an access time that is unknown to the compiler. Further, a delay for the transferring in the crossbar switch is unknown to the compiler. The monitoring can be used to track actual access times and transferring or transit times. In the flow 200, the holding enables compliance 212 to cycles. The compliance to cycles can be used to enable memory access operations to occur within a particular cycle, within a number of cycles, within a window such as a time window, and the like. In the flow 200, the holding can be accomplished using access buffers 214 coupled to a memory cache. The access buffers can be loaded with memory access data prior to the data being stored into a memory such as the memory data cache. The access buffers can be used to accumulate data produced by operations executed on the array for storing in the data cache. In the flow 200, the holding prevents premature data promotion 216 into or out of the memory cache. Premature data into or out of the memory cache can include loading stale or out-of-data data, overwriting valid data, and so on. The premature data promotion can cause a hazard fault or condition. In embodiments, the hazards can include write-after-read, read-after-write, and write-after-write conflicts.

The flow 200 further includes transferring 220 the memory access data between the array of compute elements and the access buffers. The access buffers can be coupled to a cache memory such as a data cache. The cache memory can include a multilevel cache, where each increasing level of cache can be larger, slower, etc. compared to a previous cache level. In embodiments, the data cache can include three levels of cache such as level 1 (L1) cache, level 2 (L2) cache, and level 3 (L3) cache. More or fewer levels of cache can be included. The access buffers can hold data produced by operations executed on the array of compute elements prior to releasing or promoting the data to the data cache. The holding data in the access buffers can ameliorate hazard conditions. In the flow 200, the transferring the memory access data is accomplished using a crossbar switch 222. A crossbar switch can include a fast-switching technique which can be used to connect an input of the crossbar switch to an output of the crossbar switch. In embodiments, the crossbar switch can be used to connect any input to an output of the crossbar switch. The transferring the data can include an amount of time such as a transit time. The transiting the data across the crossbar switch can be accomplished in one or more cycles. The data transit time across the crossbar switch can vary depending on how much data is being transferred across the switch within a given cycle. In embodiments, a delay for the transferring is unknown to the compiler. The plurality of compute element operations can be unknown by the compiler at compile time. This uncertainty can result because of parallel processing of a plurality of compute element operations associated with multiple tasks, subtasks, etc.

The flow 200 further includes tagging 224 store accesses with a unique precedence tag. The unique precedence tag can be based on a count, a "time to live", and so on. In embodiments, the unique precedence tag can be based on a cycle count. The cycle count can include a number of cycles within which a given store access must occur. If the given store access does not occur within the number of cycles, then the store does not occur in time and an out-of-time error, exception, violation, etc., can be thrown. The exception can cause operation of the compute element array to be halted until the error can be corrected. In embodiments the unique precedence tag enables load access priority in the crossbar switch. The unique precedence tag can be prepended to control word precedence information provided by the compiler. The prepending can form a unique tuple comprising the unique precedence tag information and the precedence information from the compiler for every store access operation. In embodiments, the unique precedence tag can enable load access priority 226 in the crossbar switch. The priority can be based on cycle number or range of cycle numbers, a processing priority or importance, and the like. In embodiments, the precedence information can enable hardware ordering of memory access loads to the array of compute elements and memory access stores from the array of compute elements. The hardware ordering can be used to address the memory cache access time and the delay for transferring that are both unknown to the compiler at compile time. The hardware ordering can be used to identify hazardous loads and stores and to mitigate the hazards. Discussed previously, the hazards can be avoided by delaying the promoting of data to the access buffer and/or the releasing of data from the access buffer.

Described above, the control provided by the control words can be provided on a cycle-by-cycle basis. In addition to configuring elements such as compute elements within the array of elements, the provided control can include loading and storing data; routing data to, from, and among compute elements; and so on. The control is enabled by a stream of wide control words generated by the compiler. The control words can configure the compute elements and other elements within the array; enable or disable individual compute elements or rows and/or columns of compute elements; load and store data; route data to, from, and among compute elements; etc. The one or more control words are generated by the compiler as discussed above. The compiler can be used to map functionality to the array of compute elements. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data, nor is a control word portion, which can be called a control word bunch, required by it. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
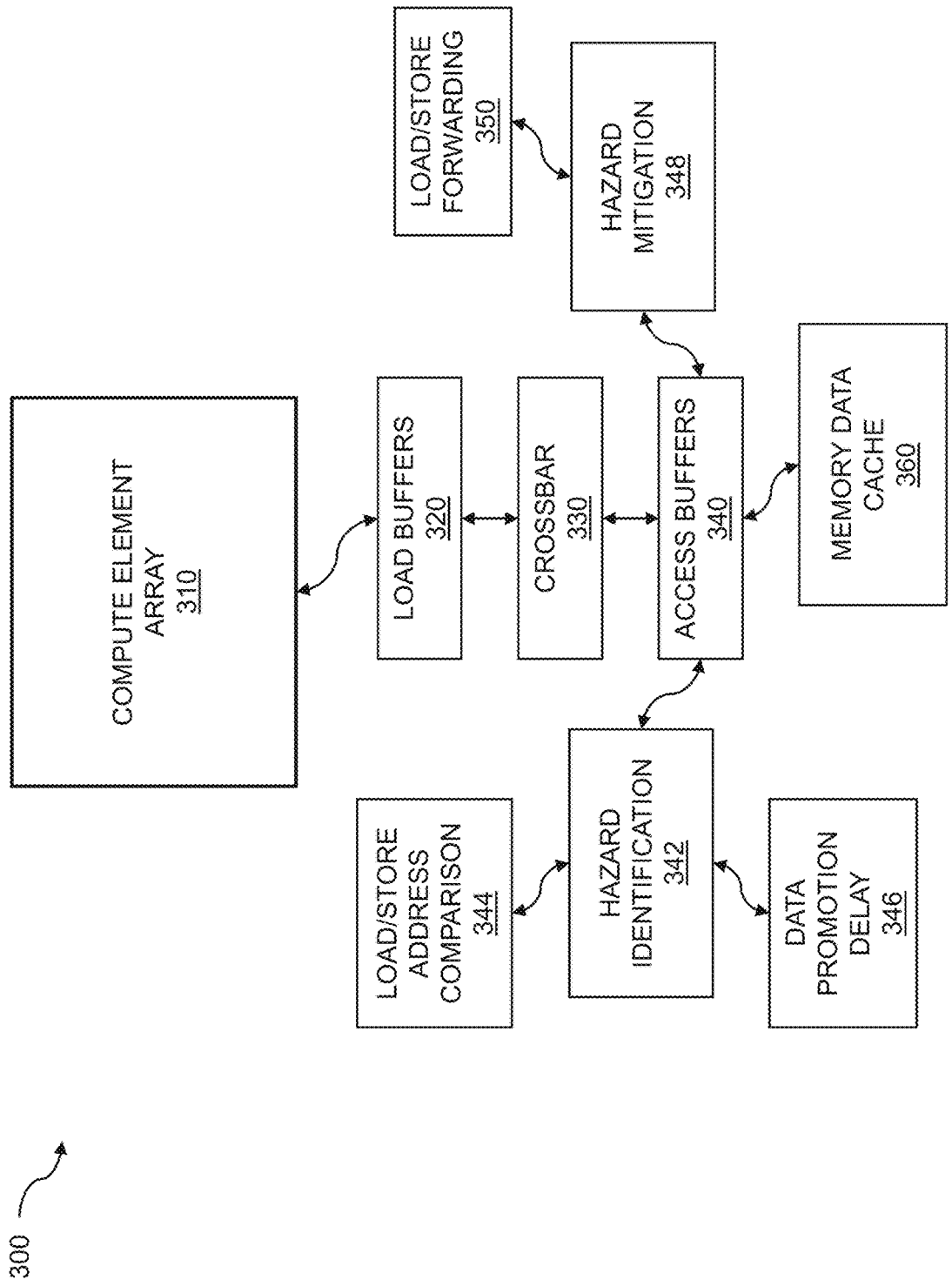
FIG. 3 is a system block diagram showing hazard detection and mitigation.

FIG. 3 is a system block diagram showing hazard detection and mitigation. An array of elements can be configured to process data. As discussed previously and throughout, the elements can include compute elements, processing elements, buffers, one or more levels of cache storage, system management buffers, arithmetic logic units, multipliers, memory management units, and so on. Data can be loaded from a memory such as a cache memory into the compute elements for processing, and processing results can be stored back to memory. Since the array of compute elements can be configured for parallel processing applications, the order in which the data loads and the data stores are executed is critical. The data to be loaded must be valid, and the data that is stored must not overwrite valid data yet to be loaded for processing. Loading invalid data or storing data over valid data are considered hazards. Various hazards can be identified by assigning precedence information to memory access operations. The hazards can be mitigated by monitoring memory access operations, and by holding memory access data before promotion. The hazard detection and mitigation enable parallel processing. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

Processes, tasks, subtasks, and so on can be executed on a parallel processing architecture. Some of the tasks, for example, can be executed in parallel, while others must be properly sequenced. The sequential execution and the parallel execution of the tasks are dictated in part by the existence of or absence of data dependencies between tasks. In a usage example, a task A processes input data and produces output data that is required by task B. Thus, task A must be executed prior to executing task B. Task C, however, executes tasks that process the same input data as task A and produces output data. Thus, task C can be executed in parallel with task A. The execution of tasks can be based on memory access operations, where the memory access operations include data loads from memory, data stores to memory, and so on. If, in the example just recited, task B were to attempt to access data before task A and produced the required data, a hazard would occur. Thus, hazard detection and mitigation can be critical to successful parallel processing. In embodiments, the hazards can include write-after-read, read-after-write, and write-after-write conflicts. The hazard detection can be based on identifying memory access operations that access the same address. Precedence information associated with each memory address operation can be used to coordinate memory access operations so that valid data can be loaded, and to ensure that valid data is not corrupted by a store operation overwriting the valid data. Techniques for hazard detection and mitigation can include holding memory access data before promotion, delaying the promoting of data to the access buffer and/or the releasing of data from the access buffer, and so on.

Data can be moved between a memory such as a memory data cache, and storage elements associated with the array of compute elements. The storage elements associated with the array of compute elements can include scratchpad memory, register files, and so on. Memory access operations can include loads from memory, stores to memory, memory-to-memory transfers, etc. The storage elements can include local storage coupled to one or more compute elements within a 2D array of compute elements; storage associated with the array, cache storage, a memory system, and so on. A load memory access operation can load control words, compressed control words, bunches of bits associated with control words, data, and the like. Memory access operations enable parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

The figure illustrates a block diagram for hazard detection and mitigation. One or more hazards, which can be encountered during memory access operations, can result when two or more memory access operations attempt to access the same memory address. While multiple loads (reads) from an address may not create a hazard, combinations of loads and stores to the same address are problematic. Hazard detection and mitigation techniques enable memory access operations to be performed while avoiding hazards. The memory access operations include loading data from memory and storing data to memory. The data is loaded from memory to supply data to tasks, subtasks, and so on to be executed on an array. Data produced by the tasks and subtasks can be stored back to the memory. The array can include an array of compute elements 310. The array can include a two-dimensional array, stacked two-dimensional arrays, and so on. The data can be loaded or stored based on a number of bytes, words, blocks, etc.

Data movement, whether loading, storing, transferring, etc., can be accomplished using a variety of techniques. In embodiments, memory access operations can be performed outside of the array of compute elements, thereby freeing the compute elements to execute tasks, subtasks, etc. Memory access operations, such as autonomous memory operations, can preload data needed by one or more compute elements. In additional embodiments, a semi-autonomous memory copy technique can be used for transferring data. The semi-autonomous memory copy can be accomplished by the array of compute elements which generates source and target addresses required for the one or more data moves. The array can further generate a data size such as 8, 16, 32, or 64-bit data sizes, and a striding value. The striding value can be used to avoid overloading a column of storage components such as a cache memory. The source and target addresses, data size, and striding can be under direct control of a compiler.

The block diagram 300 can include load buffers 320. The load buffers can include two or more buffers associated with the compute element array. The buffers can be shared by the compute elements within the array, a subset of compute elements can be assigned to each buffer, etc. The load buffers can hold data targeted to one or more compute elements within the array as the data is read from a memory such as data cache memory. The load buffers can be used to accumulate an amount of data before transferring the data to one or more compute elements, to retime (e.g., hold or delay) delivery of data loaded from storage prior to data transfer to compute elements, and the like. The block diagram 300 can include a crossbar switch 330. The crossbar switch can provide selectable communication paths between buffers associated with a memory (discussed shortly below). The crossbar switch enables transit of memory access data between buffers associated with the memory and the load buffers associated with the compute elements. The crossbar switch can enable multiple data access operations within a given cycle.

The block diagram 300 can include access buffers 340. Two or more access buffers can be coupled to a memory such as data cache memory (discussed below). The access buffers can hold data such as store data produced by operations associated with tasks, subtasks, etc. The operations are executed using compute elements within the array. In embodiments, the holding can be accomplished using access buffers coupled to a memory cache. The holding can be based on monitoring memory access operations that have been tagged. The tagging can be contained in the control words, and the tagging can be provided by the compiler at compile time. The load data can be held in the access buffers prior to the data transiting the crossbar switch to the load buffers or being directed to compute elements within the array. Since there is a transit latency associated with the crossbar switch, load data can transit the crossbar switch in as early a cycle as possible without triggering a hazard event. The block diagram 300 can include a hazard identification component 342. Recall that a hazard can exist when valid data is not available for a memory access load operation requesting the data. Further, a hazard can exist when valid data would be overwritten by a memory access store operation. In embodiments, the hazards can include write-after-read, read-after-write, and write-after-write conflicts. The access buffers can be used as part of a hazard identification technique. Updated memory access store data may be available in the access buffer prior to the data being stored to memory. A determination of whether requested data is still within the access buffer rather than already in the memory can be made by comparing load and store addresses 344. Further embodiments include identifying hazardous loads and stores by comparing load and store addresses to contents of an access buffer. Recall that hazards can occur when conflicting or mistimed memory access operations are executed. In embodiments, the comparing can identify potential accesses to the same address. The comparing can further include using the precedence information that was used to tag memory access operations.

The system block diagram includes a data promotion delay component 346. The delaying component can be used to avoid the various types of memory access hazards. Further embodiments can include delaying the promoting of data to the access buffer and/or the releasing of data from the access buffer. The delay in promoting and/or releasing data enables the data to be made available to an operation executing on a compute element when the data is required. In embodiments, the avoiding hazards can be based on a comparative precedence value. The comparative precedence value can be used to determine the amount of delay required to avoid a hazard. The block diagram 300 includes a hazard mitigation component 348. The identifying the hazards enables the identified hazards to be mitigated. Recall that data produced by executing data operations on one or more compute elements within the array is loaded into the access buffers prior to the data being stored into memory. As a result, data needed by a subsequent operation may still be within the access buffers rather than at a target address specified by the operation. Discussed previously, load and store addresses can be compared to contents of an access buffer. In embodiments, the access buffer can be based on a content addressable memory. The system block diagram 300 can include a load/store forwarding component 350. The load/store forwarding component can access contents of one or more access buffers. The accessed data can be provided or received for load or store operations respectively to accomplish hazard mitigation. In embodiments, the hazard mitigation can include load-to-store forwarding, store-to-load forwarding, and store-to-store forwarding. The forwarding is based on accessing data within one or more access buffers rather than from the memory.

The system block diagram includes a memory data cache 360. The cache can include one or more levels of cache. In embodiments, the cache can include levels such as a level 1 (L1) cache, a level 2 (L2) cache, a level 3 (L3) cache, and so on. The L1 cache can include a small, fast memory that is accessible to the compute elements within the compute element array. The L2 cache can be larger than the L1 cache, and the L3 cache can be larger than the L2 cache and the L1 cache. When a compute element within the array initiates a load operation, the data associated with the load operation is first sought in the L1 cache, then the L2 cache if absent from the L1 cache, then the L3 cache if the load operation causes a "miss" (e.g., the requested data is not located in a cache level). The L1 cache, the L2 cache, and the L3 cache can store data, control words, compressed control words, and so on. In embodiments, the L3 cache can comprise a unified cache for data and compressed control words (CCWs).

Figure 4:
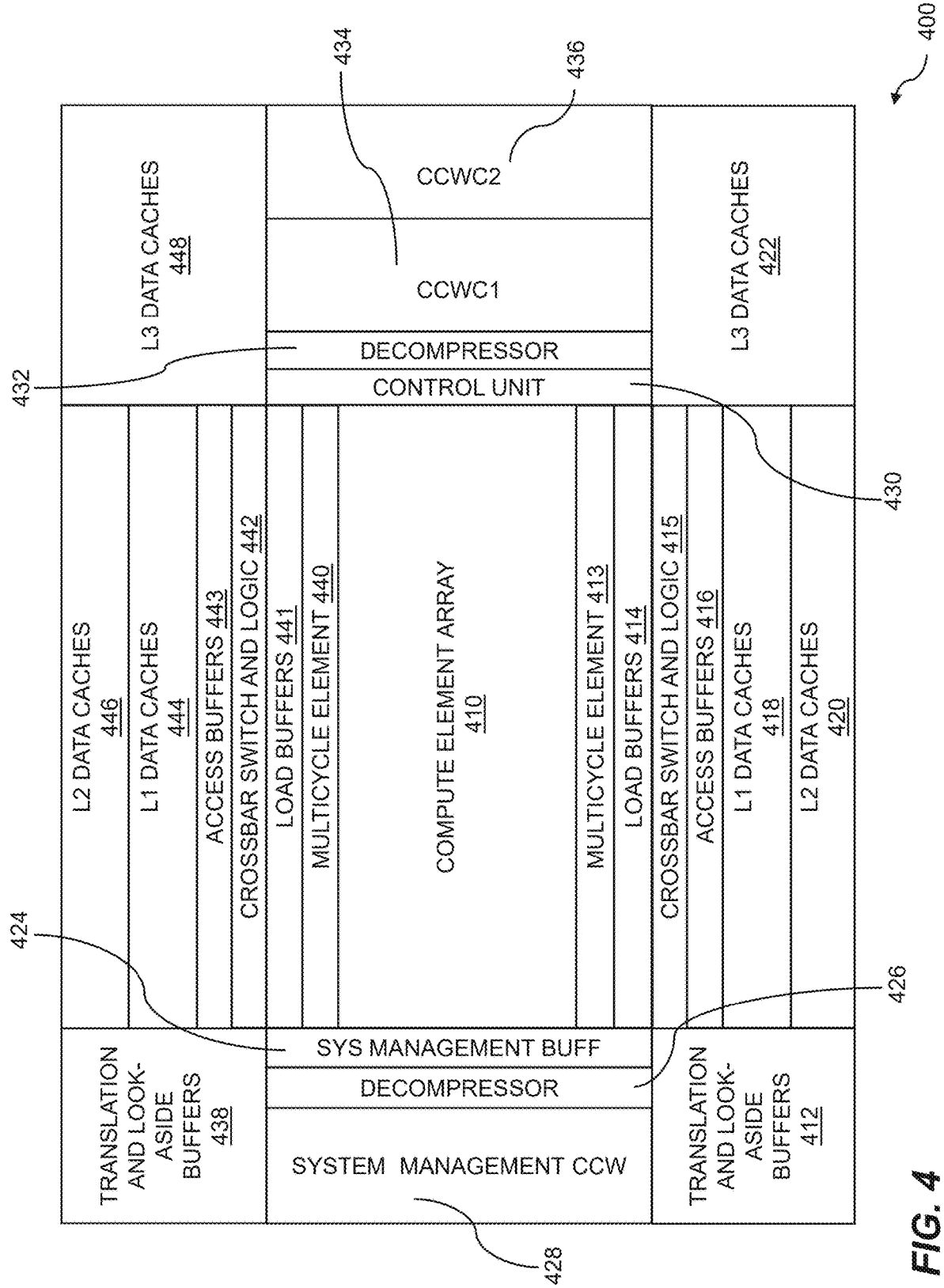
FIG. 4 is a system block diagram for a highly parallel architecture with a shallow pipeline.

FIG. 4 is a system block diagram for a highly parallel architecture with a shallow pipeline. The highly parallel architecture can comprise a variety of components such as compute elements, processing elements, buffers, one or more levels of cache storage, system management buffers, arithmetic logic units, multipliers, memory management units, and so on. The various components can be used to accomplish parallel processing of tasks, subtasks, and the like. The parallel processing is associated with program execution, job processing, etc. The parallel processing is enabled based on parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

A system block diagram 400 for a highly parallel architecture with a shallow pipeline is shown. The system block diagram can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 412 and 438. The translation and look-aside buffers can comprise memory caches, where the memory caches can be used to reduce storage access times.

The system block diagram 400 can include logic for load and store access order and selection. The logic for load and store access order and selection can include crossbar switch and logic 415 along with crossbar switch and logic 442. Crossbar switch and logic 415 can accomplish load and store access order and selection for the lower data caches (418 and 420), and crossbar switch and logic 442 can accomplish load and store access order and selection for the upper data caches (444 and 446). Crossbar switch and logic 415 enables high-speed data communication between the lower-half compute elements of compute element array 410 and data caches 418 and 420 using access buffers 416. Crossbar switch and logic 442 enables high-speed data communication between the upper-half compute elements of compute element array 410 and data caches 444 and 446 using access buffers 443. The access buffers 416 and 443 allow logic 415 and logic 442, respectively, to hold, load, or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 418 and 420 and upper data caches 444 and 446.

The system block diagram 400 can include lower load buffers 414 and upper load buffers 441. The load buffers can provide temporary storage for memory load data so that it is ready for low latency access by the compute element array 410. The system block diagram can include dual level 1 (L1) data caches, such as L1 data caches 418 and 444. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 420 and 446. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 422 and 448. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multicycle element 413 and upper multicycle element 440. The multicycle elements (MEMs) can provide efficient functionality for operations, such as multiplication operations, that span multiple cycles. The MEMs can provide further functionality for operations that can be of indeterminant cycle length, such as some division operations, square root operations, and the like. The MEMs can operate on data coming out of the compute element array and/or data moving into the compute element array. Multicycle element 413 can be coupled to the compute element array 410 and load buffers 414, and multicycle element 440 can be coupled to compute element array 410 and load buffers 441.

The system block diagram 400 can include a system management buffer 424. The system management buffer can be used to store system management codes or control words that can be used to control the array 410 of compute elements. The system management buffer can be employed for holding opcodes, codes, routines, functions, etc. which can be used for exception or error handling, management of the parallel architecture for processing tasks, and so on. The system management buffer can be coupled to a decompressor 426. The decompressor can be used to decompress system management compressed control words (CCWs) from system management compressed control word (CCW) buffer 428 and can store the decompressed system management control words in the system management buffer 424. The compressed system management control words can require less storage than the decompressed control words. The system management CCW buffer 428 can also include a spill buffer. The spill buffer can comprise a large static random-access memory (SRAM), which can be used to provide rapid support of multiple nested levels of exceptions.

The compute elements within the array of compute elements can be controlled by a control unit such as control unit 430. While the compiler, through the control word, controls the individual elements, the control unit can pause the array to ensure that new control words are not driven into the array. The control unit can receive a decompressed control word from a decompressor 432 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 434. CCWC1 can include a cache such as an L1 cache that includes one or more compressed control words. CCWC1 can be coupled to a further compressed control word store such as compressed control word cache 2 (CCWC2) 436. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 432 can be coupled between CCWC1 434 (now DCWC1) and CCWC2 436.

Figure 5:
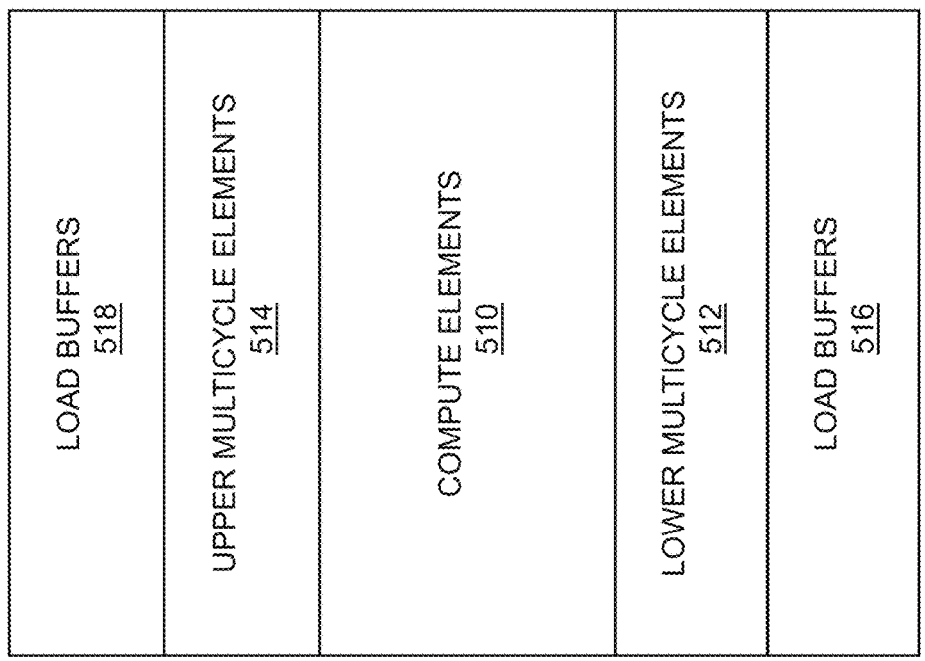
FIG. 5 shows compute element array detail.

FIG. 5 shows compute element array detail 500. A compute element array can be coupled to components which enable the compute elements within the array of compute elements to process one or more tasks, subtasks, and so on. The components can access and provide data, perform specific high-speed operations, and the like. The components can be configured into a variety of computational topologies. The compute element array and its associated components enable parallel processing using hazard detection and mitigation. The compute element array 510 can perform a variety of processing tasks, where the processing tasks can include operations such as arithmetic, vector, matrix, or tensor operations; audio and video processing operations; neural network operations; etc. The compute elements can be coupled to multicycle elements such as lower multicycle elements 512 and upper multicycle elements 514. The multicycle elements can provide functionality to perform, for example, high-speed multiplications associated with general processing tasks, multiplications associated with neural networks such as deep learning networks, multiplications associated with vector operations, and so on. The multiplication operations can span multiple cycles. The MEMs can provide further functionality for operations that can be of indeterminant cycle length, such as some division operations, square root operations, and the like.

The compute elements can be coupled to load buffers such as load buffers 516 and load buffers 518. The load buffers can be coupled to the L1 data caches as discussed previously. In embodiments, a crossbar switch (not shown) can be coupled between the load buffers and the data caches. The load buffers can be used to load storage access requests from the compute elements. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory) can be performed. The memory systems can be free running and can continue to operate while the array is paused. Because multicycle latency can occur due to control signal transport that results in additional "dead time", allowing the memory system to "reach into" the array and to deliver load data to appropriate scratchpad memories while the array is paused can be beneficial. This mechanism can operate such that the array state is known, as far as the compiler is concerned. When array operation resumes after a pause, new load data will have arrived at a scratchpad, as required for the compiler to maintain the statically scheduled model.

Figure 6:
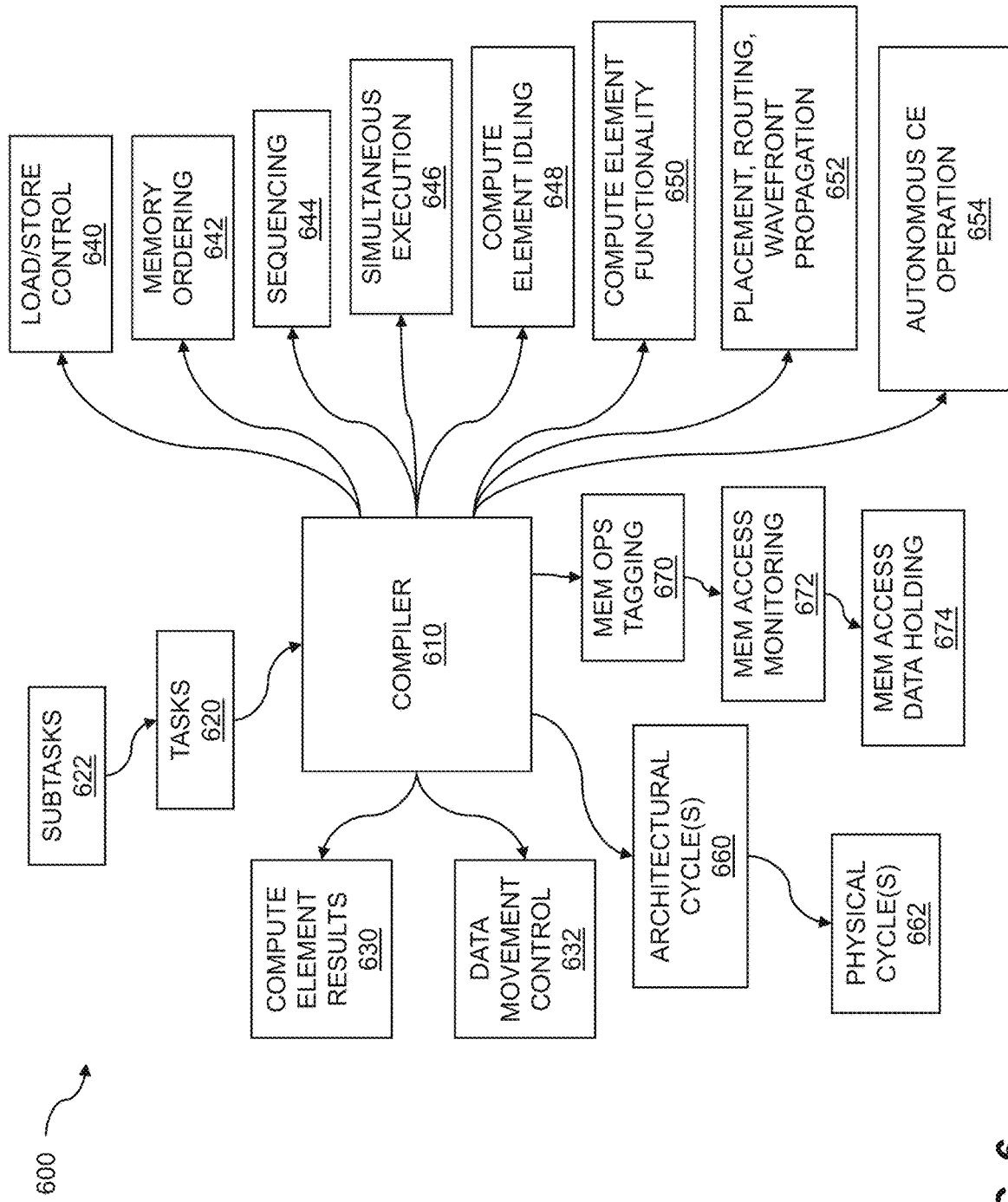
FIG. 6 is a system block diagram for compiler interactions.

FIG. 6 is a system block diagram for compiler interactions. Discussed throughout, compute elements within an array are known to a compiler which can compile processes, tasks, subtasks, and so on for execution on the array. The compiled tasks, subtasks, etc. comprise operations which can be executed on one or more compute elements within the array. The compiled tasks and subtasks are executed to accomplish task processing. The task processing can be accomplished based on parallel processing of the tasks and subtasks. Processing the tasks and subtasks includes accessing memory such a data memory, a cache, a scratchpad memory, etc. The memory accesses can cause memory access hazards if the memory accesses are not carefully orchestrated. A variety of interactions, such as placement of tasks, routing of data, and so on, can be associated with the compiler. The compiler interactions enable parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the compute elements and other elements within the array. The compiler can be used to compile tasks 620. The tasks can include a plurality of tasks associated with a processing task. The tasks can further include a plurality of subtasks 622. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements, where the compute elements can share input data, use independent data, and the like. The compiler can generate a set of directions that control data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler 610 can provide directions for task and subtask handling, input data handling, intermediate and result data handling, and so on. The directions can include one or more operations, where the one or more operations can be executed by one or more compute elements within the array of compute elements. The compiler can further generate directions for configuring the compute elements, storage elements, control units, ALUs, and so on, associated with the array. As previously discussed, the compiler generates directions for data handling to support the task handling. In the system block diagram, the data movement can include loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, a level 2 (L2) cache, a level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data can be ordered based on task data requirements, subtask data requirements, and so on. The memory data ordering can enable parallel execution of tasks and subtasks.

In the system block diagram 600, the ordering of memory data can enable compute element result sequencing 644. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 646 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 648. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 650. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 652 within the array of compute elements. The compiler can generate directions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements. The system block diagram 600 can include autonomous compute element (CE) operation 654. As described throughout, autonomous CE operation enables one or more operations to occur outside of direct control word management.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory buffer to clear. In the system block diagram, the architectural cycle can include one or more physical cycles 662. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and doublewords.

The system block diagram 600 includes memory access operations tagging 670. The memory access operations can include memory load operations, memory store operations, and so on. The compiler can be used to tag the memory access operations with precedence information, where the precedence information can include a memory access priority, operation order, etc. The precedence tag can include a tag within a moving window. The moving window can include an amount of time, one or more cycles, and the like. In embodiments, the tagging can be contained in the control words, where the control words can include control words provided on a cycle-by-cycle basis. The control words are generated by the compiler. In further embodiments, the tagging is provided by the compiler at compile time. Discussed previously, memory access load data and store data can transit a crossbar switch. Further embodiments can include transferring the memory access data between the array of compute elements and access buffers using a crossbar switch. The transferring of memory access data using a crossbar switch can experience a delay, where the delay can be based on the crossbar switch configuration, other memory access operations that occur within a cycle, etc. The delay is unknown to the compiler at compile time. In embodiments, the unique precedence tag can enable load access priority in the crossbar switch.

The system block diagram 600 includes memory access operation monitoring 672. The monitoring can include tracking memory access load operations and store operations, task execution progress, and so on. In embodiments, the monitoring is based on the precedence information and a number of architectural cycles of the cycle-by-cycle basis. The monitoring of the memory access operations can be used to determine whether valid data is generated within a number of cycles, that valid requested data arrives within a number of cycles, and the like. The monitoring can be used to determine whether tagging information remains accurate. Further embodiments include augmenting the tagging at run time, based on the monitoring. Since memory access times, crossbar switch transit times, etc. are unknown to the compiler at compile time, then actual memory access times, crossbar transit times, etc. experienced by the array during execution of compute element operations can be used to augment the tagging to ensure that the precedence information can remain valid.

The system block diagram 600 includes memory access data holding 674. The memory access data that can be held can include load data and store data. The data holding can be based on an amount of time, a number of cycles, and so on. In embodiments, the holding memory access data before promotion is accomplished based on the monitoring. Discussed previously, the monitoring can enable the holding of data in one or more buffers. In embodiments, the holding can be accomplished using access buffers coupled to a memory cache. The access buffers can be located between the crossbar switch and storage such as the memory cache. The holding can accomplish delay, memory access retiming, etc. In embodiments, the holding can prevent premature data promotion into or out of the memory cache. Premature data promotion can result in overwriting or storing valid data before it can be loaded, loading invalid data, and so on. Such memory data loading and storing faults or hazards can cause the array of compute elements to stall or halt operation until valid data can be obtained. In embodiments, the data hazards can include write-after-read, read-after-write, and write-after-write conflicts. The delaying enabled by the data holding can avoid hazards, based on a comparative precedence value. With one or more hazards identified or detected, hazard mitigation techniques can be applied to the memory access operations. In embodiments, the hazard mitigation includes load-to-store forwarding, store-to-load forwarding, and store-to-store forwarding. In a usage example, a store operation places data into the access buffer for storing at an address in the data cache. An operation that executes subsequently to the store operation requests load data from the same data cache address, the contents of which have not yet been updated by the previous store operation. To mitigate the hazard, the contents of the access buffer can be searched for updated but unprompted data prior to seeking the data in the data cache. In embodiments, the access buffer can comprise a content addressable memory (CAM). Thus, the correct, updated data can be obtained by the latter operation.

Figure 7:
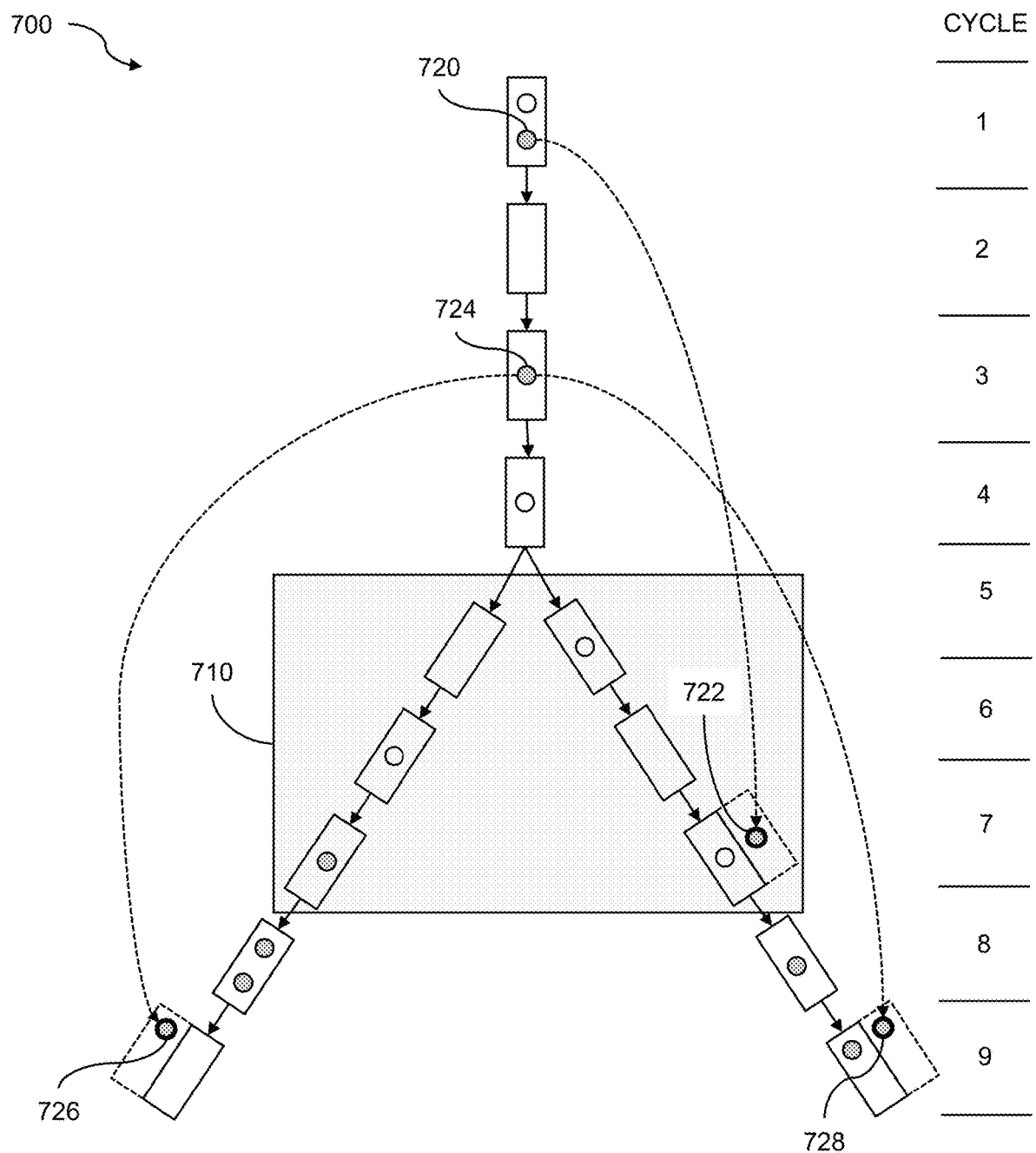
FIG. 7 shows branch handling for hazard detection and mitigation.

FIG. 7 shows branch handling for hazard detection and mitigation. Discussed previously, branches can occur within processes, tasks, and subtasks that can be executed on compute elements within an array. The branch operations are based on decisions that are determined with code that implements the processes, tasks, subtasks, etc. The branch can be based on one or more logical operations such as AND, NAND, OR, NOR, XOR, XNOR operations, and so on. The branches can be based on one or more arithmetic operations such as addition, subtraction, multiplication, division, etc. The branches can cause a context switch. To speed execution of branches when a branch decision is determined, operations and data associated with multiple branch paths that pertain to the branch decision can be fetched prior to the branch decision being made. Further, execution of the operations associated with each branch path can begin. When the branch decision is made, execution can continue for operations associated with the taken path, while the operations associated with one or more untaken paths can be halted. The branch handling can be complex because accessing data prior to the branch decision can be rife with memory access hazards. The branch handling can be accomplished based on parallel processing using hazard detection and mitigation. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. Memory access operations are tagged with precedence information, wherein the tagging is contained in the control words, and wherein the tagging is provided by the compiler at compile time. Memory access operations are monitored, wherein the monitoring is based on the precedence information and a number of architectural cycles of the cycle-by-cycle basis. Memory access data is held before promotion, based on the monitoring.

The figure shows branch handling including hazard detection and mitigation. Recall that a hazard can occur when valid data is not available for loading as a compute element requests the data, when valid data is overwritten by store data before the valid data can be loaded or stored, and so on. Such hazards may be identified by comparing load and store addresses of memory access operations requested by compute element operations. Recall that memory access data can be held prior to promotion (e.g., storing into memory, loading into compute elements, etc.) As a result, data associated with memory access operations may still be located within buffers such as access buffers. Embodiments can include identifying hazardous loads and stores by comparing load and store addresses to contents of an access buffer. The comparing can be accomplished by comparing contents of the access buffer, among other techniques. In embodiments, the comparing can identify potential accesses to the same address. Additional information such as the precedence information used to tag memory access operations can provide further insight into identifying hazards by indicating an order of memory access operations, timing information such as a cycle or relative cycle in which a memory access operation takes place, etc. Further embodiments comprise including the precedence information in the comparing.

In the figure, execution of compute element operations associated with control words provided on a cycle-by-cycle basis is shown. The operations include a branch operation which can be used to decide between two branch paths, a left side path, and a right-side path. Discussed previously, the identifying memory access load and store hazards can enable hazard mitigation. In the example 700, speculative encoding within code words of both branch paths can enable "prefetching" of compute element operations and data manipulated by the operation. The prefetching can include loading data manipulated by operations associated with both paths. A branch shadow 710 can include a number of cycles during which operations associated with each branch path can be executed prior to the branch decision. In the example, the branch shadow can occur during cycles 5, 6, and 7. The branch shadow can correspond to execution of operations associated with cycles 2, 3, and 4. During the branch shadow, loading data from buffers such as access buffers cannot be allowed because the data in the access buffers may be updated during the cycles prior to the branch operation. As a result, the hazard mitigation techniques described before, namely hazard mitigation accomplished by load-to-store forwarding, store-to-load forwarding, and store-to-store forwarding, cannot be allowed. To ameliorate this problem, stores from the untaken branch path can be suppressed from departing the array. By suppressing the stores from the untaken branch path from departing the array, crossbar resources and access buffer resources can be preserved.

Returning to the figure, a compiled code snippet comprising nine control words includes a branch decision at control word 4. Each cycle can include a data load operation, a data processing operation, data store operations, and so on. In the figure, an open circle represents a store address and store data emerging from the array of compute elements; a filled circle represents a load address emerging from the array; and the bold, filled circle represents a scheduled load data pickup by the array. In the example, load and store access operations that emanate from the compute element array are not suppressed in the access buffers for branch paths not taken during the branch shadow 710. The "not suppressing" load operations and store operations can maximize throughput and minimize latency of a crossbar switch coupled between the compute element array and the access buffers. A precedence tag associated with cycle 1 720 can indicate cycle 7 722, the cycle during which the load data is taken up by the array for processing. Similarly, a precedence tag associated with cycle 3 724 can indicate right-hand branch path cycle 9 726 and its branch analog, left-hand branch path cycle 9 728. Cycle 9 is the cycle during which the load data, indicated with cycle 3, is taken up by the array for processing. If the branch decision in cycle 4 indicates to proceed down the right-hand side branch (e.g., the taken path), then the load in cycle 6 and the store in cycle 7 of the left-hand side branch (e.g., the not taken path) can be suppressed or ignored prior to entry to the crossbar switch. The two store operations in cycle 8 of the left-hand side branch are not executed because the code illustrated in the code snippet has branched away from this the left-hand branch within the array.

The memory access store operations associated with cycles 1, 4, and 5 can be aliased into the load operation issued in cycle 1 720 to ameliorate a read-after-write hazard associated with the right-hand path. The store operations associated with cycles 4, 5, and 7 can be aliased into the load operation issued in cycle 3 724 to ameliorate a read-after-write hazard associated with the right-hand path. The store operations associated with cycles 4 and 6 can alias into the load operation issued in cycle 3 to ameliorate a read-after-write hazard associated with the left-hand path. The store operation associated with cycle 8 can be aliased to the other store operation associated with cycle 8 to ameliorate a write-after-write hazard for the left-hand path.

Figure 8:
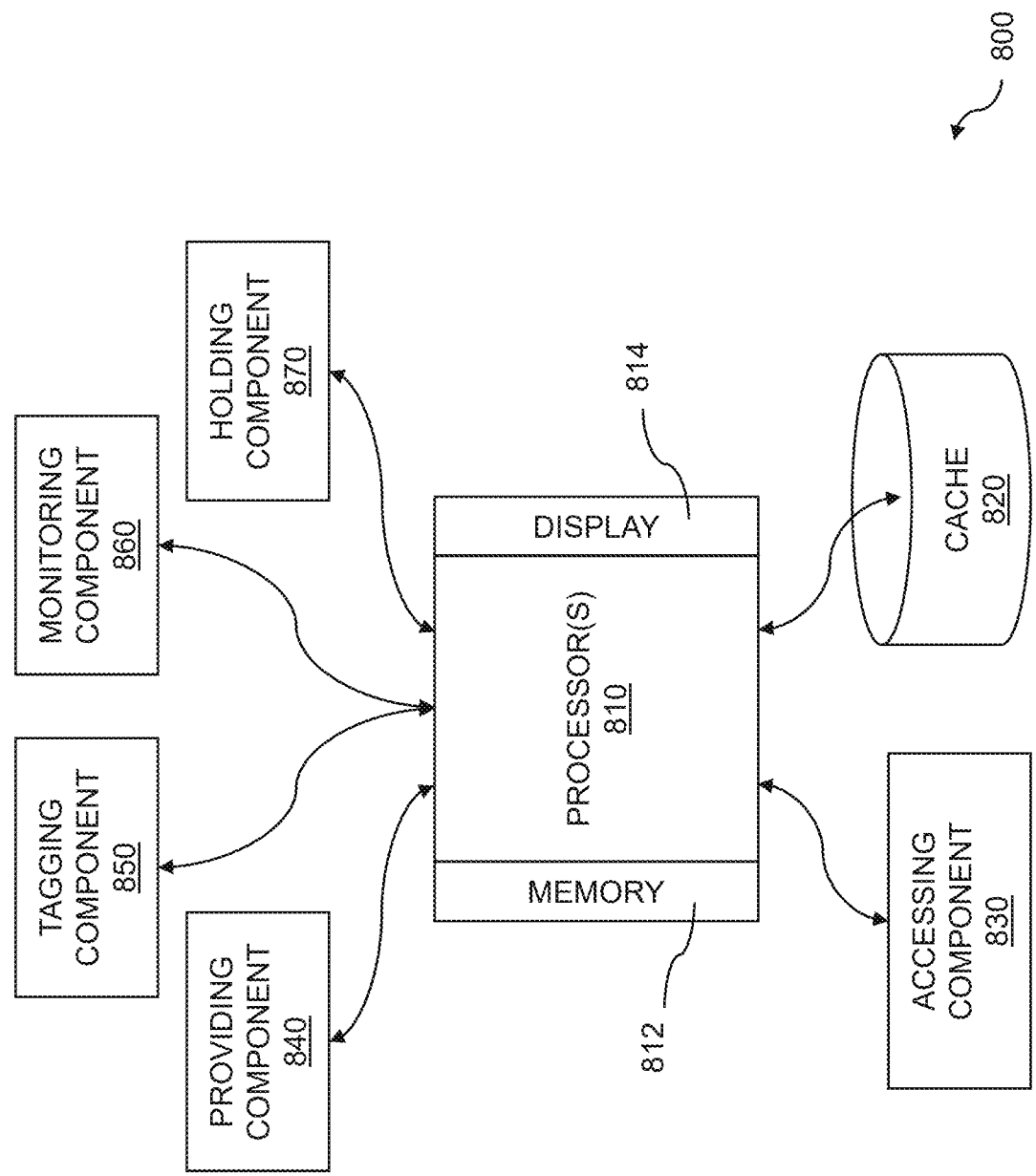
FIG. 8 is a system diagram for parallel processing using hazard detection and mitigation.

FIG. 8 is a system diagram for parallel processing. The parallel processing is enabled by parallel processing using hazard detection and mitigation. The system 800 can include one or more processors 810, which are attached to a memory 812 which stores instructions. The system 800 can further include a display 814 coupled to the one or more processors 810 for displaying data and for tagging information such as precedence information; intermediate steps; directions; compressed control words; fixed-length control words; control words implementing Very Long Instruction Word (VLIW) functionality, topologies including systolic, vector, cyclic, spatial, streaming, or VLIW topologies; and so on. In embodiments, one or more processors 810 are coupled to the memory 812, wherein the one or more processors, when executing the instructions which are stored, are configured to: access an array of compute elements, wherein each compute element within the array of compute elements is known to a compiler and is coupled to its neighboring compute elements within the array of compute elements; provide control for the compute elements on a cycle-by-cycle basis, wherein control is enabled by a stream of wide control words generated by the compiler; tag memory access operations with precedence information, wherein the tagging is contained in the control words, and wherein the tagging is provided by the compiler at compile time; monitor memory access operations, wherein the monitoring is based on the precedence information and a number of architectural cycles of the cycle-by-cycle basis; and hold memory access data before promotion, based on the monitoring. The plurality of compressed control words is decompressed by hardware associated with the array of compute elements and is driven into the array. The plurality of compressed control words is decompressed into fixed-length control words that comprise one or more compute element operations. The compute element operations are executed within the array of compute elements. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 800 can include a cache 820. The cache 820 can be used to store data such as tagging information which includes memory access hazard information; precedence information; directions to compute elements; decompressed, fixed-length control words; compute element operations associated with decompressed control words; intermediate results; microcode; branch decisions; and so on. The cache can comprise a small, local, easily accessible memory available to one or more compute elements. In embodiments, the data that is stored within the cache can include the precedence information which enables hardware ordering of memory access loads to the array of compute elements and memory access stores from the array of compute elements. The precedence information can provide semantically correct operation ordering. The data that is stored within the cache can further include linking information; compressed control words; decompressed, fixed-length control words; etc. Embodiments include storing relevant portions of a control word within the cache associated with the array of compute elements. The cache can be accessible to one or more compute elements. The cache, if present, can include a dual read, single write (2R1W) cache. That is, the 2R1W cache can enable two read operations and one write operation contemporaneously without the read and write operations interfering with one another. The cache can be coupled to operate in cooperation with scratchpad storage. The scratchpad storage can include a small, fast, local memory element coupled to one or more compute elements. In embodiments, the scratchpad storage can act as a "level zero" or L0 cache within a multi-level cache storage hardware configuration.

The system 800 can include an accessing component 830. The accessing component 830 can include control logic and functions for accessing an array of compute elements. Each compute element within the array of compute elements is known to a compiler and is coupled to its neighboring compute elements within the array of compute elements. A compute element can include one or more processors, processor cores, processor macros, and so on. Each compute element can include an amount of local storage. The local storage may be accessible to one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX).

The system 800 can include a providing component 840. The providing component 840 can include control and functions for providing control for the compute elements on a cycle-by-cycle basis, wherein control is enabled by a stream of wide control words generated by the compiler. The plurality of control words enables compute element configuration and operation execution; compute element memory access; inter-compute element communication, etc., on a cycle-by-cycle basis. The control words can further include variable bit-length control words, compressed control words, and so on. The control words can be based on low-level control words such as assembly language words, microcode words, firmware words, and so on. In embodiments, the stream of wide, variable length control words generated by the compiler provides direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a paralleliz-ing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. The control can enable machine learning functionality for the neural network topology.

The control of the array of compute elements on a cycle-by-cycle basis can include configuring the array to perform various compute operations. In embodiments, the stream of wide control words generated by the compiler provides direct fine-grained control of the 2D array of compute elements. The fine-grained control can include individually controlling each compute element, irrespective of type of compute element. A compute element type can include an integer, floating-point, address generation, write buffer, read buffer, and the like. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies, such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a network topology such as a neural network topology, a Petri Net topology, etc. A control can enable machine learning functionality for the neural network topology.

In embodiments, the control word from the stream of wide control words can include a source address, a target address, a block size, and a stride. The target address can include an absolute address, a relative address, an indirect address, and so on. The block size can be based on a logical block size, a physical memory block size, and the like. In embodiments, the memory block transfer control logic can compute memory addresses. The memory addresses can be associated with memory coupled to the 2D array of compute elements, shared memory, a memory system, etc. Further embodiments can include using memory block transfer control logic. The memory block transfer control logic can include one or more dedicated logic blocks, configurable logic, etc. In embodiments, the memory block transfer control logic can be implemented outside of the 2D array of compute elements. The transfer control logic can include a logic element coupled to the 2D array. In other embodiments, the memory block transfer control logic can operate autonomously from the 2D array of compute elements. In a usage example, a control word that includes a memory block transfer request can be provided to the memory block transfer control logic. The logic can execute the memory block transfer while the 2D array of compute elements is processing control words, executing compute element operations, and the like. In other embodiments, the memory block transfer control logic can be augmented by configuring one or more compute elements from the 2D array of compute elements. The compute elements from the 2D array can provide interfacing operations between compute elements within the 2D array and the memory block transfer control logic. In other embodiments, the configuring can initialize compute element operation buffers within the one or more compute elements. The compute element operation buffers can be used to buffer control words, decompressed control words, portions of control words, etc. In further embodiments, the operation buffers can include bunch buffers. Recall that control words are based on bits. Sets of control word bits called bunches can be loaded into buffers called bunch buffers. The bunch buffers are coupled to compute elements and can control the compute elements. The control word bunches are used to configure the 2D array of compute elements, and to control the flow or transfer of data within and the processing of the tasks and subtasks on the compute elements within the array.

The control words that are generated by the compiler can further include a conditionality such as a branch. In embodiments, the control words can include branch operations. The branch can include a conditional branch, an unconditional branch, etc. The control words can be decompressed by a decompressor logic block that decompresses words from a compressed control word cache on their way to the array. In embodiments, the set of directions can include a spatial allocation of subtasks on one or more compute elements within the array of compute elements. In other embodiments, the set of directions can enable multiple, simultaneous programming loop instances circulating within the array of compute elements. The multiple programming loop instances can include multiple instances of the same programming loop, multiple programming loops, etc.

The system block diagram 800 can include a tagging component 850. The tagging component 850 can include control and functions for tagging memory access operations with precedence information, wherein the tagging is contained in the control words, and wherein the tagging is provided by the compiler at compile time. The memory access operations can include load operations, store operations, data transfer operations, and so on. Each inbound memory access or load operation to the compute element array can be tagged with a precedence tag. In embodiments, the load operation is tagged with a unique precedence tag. The precedence tag can be a tag within a moving window such as a moving time window, a tag associated with a number of cycles such as architectural cycles, etc. In embodiments, the unique precedence tag can enable load access priority in the crossbar switch. The tagging can be used to disambiguate a given inbound access or load from other memory accesses. An inbound data transfer load can include transferring data from an access buffer associated with a cache such as a memory data cache, through the crossbar switch, to a load buffer associated with the compute element array. Further embodiments include transferring memory access data between the array of compute elements and access buffers using a crossbar switch. In embodiments, a delay for the transferring can be unknown to the compiler. More than one memory access may be transiting a crossbar switch during a given cycle. Other memory accesses can be transiting the crossbar switch more rapidly than the given memory access. Outbound memory accesses or store operations can be tagged. Embodiments can include tagging store accesses with a unique precedence tag. The store access tags can also be within a window such as a time window.

The system 800 can include a monitoring component 860. The monitoring component 860 can include control and functions for monitoring memory access operations, wherein the monitoring is based on the precedence information and a number of architectural cycles of the cycle-by-cycle basis. Recall that memory cache access times, delays for transferring memory access data using the crossbar switch, and so on can be unknown to the compiler. Tagging memory access operations with precedence information can enable local monitoring by a control element such as a control element associated with the compute element array. Such monitoring can be accomplished since in embodiments, the precedence information provides semantically correct operation ordering. Thus, compute element operation execution order, data dependencies, and so on, can be maintained. In embodiments, the precedence information can include intra-control word precedence and/or inter-control word precedence. The intra-control word precedence and/or inter-control word precedence can enable the semantically correct ordering of operations. The control words can include data-dependent operations, logical evaluation-dependent operations, and so on. In embodiments, the control words can include branch operations. In order to enhance parallel operation of the compute element array, compute element operations, data, etc. associated with two or more branch paths can be prefetched. Operations associated with the two or more branch paths can begin execution prior to the branch decision being made. When the branch decision is made, then further operations associated with the taken path can be executed while operations associated with the untaken path can be halted. Further embodiments can include suppressing memory access stores for untaken branch paths. The suppressing memory access stores for the untaken paths can include ignoring the access stores, overwriting the access stores, and so on. Further embodiments include augmenting the tagging at run time, based on the monitoring. The augmenting can be based on data cache access times, crossbar switch transit times, numbers of data transfers occurring within one or more cycles, and the like.

The tagging can be based on a status, where the status can include a value such as a number of cycles; a label such as valid, pending, expired; and so on. The monitoring occurs as memory access operation is performed. The memory access operation can include accessing addresses associated with a memory system, transferring data to (e.g., load) or from (e.g., store) the 2D array, providing the data to or obtaining data from the target compute element, and so on. The executing the memory access operation can include one or more architectural cycles, physical cycles, and so on. The memory access operation can be monitored and controlled by a control unit. The control unit can further be used to control the array of compute elements on a cycle-by-cycle basis. The controlling can be enabled by the stream of wide control words generated by the compiler. The control words can be based on low-level control words such as assembly language words, microcode words, firmware words, and so on. The control words can be of variable length, such that a different number of operations for a differing plurality of compute elements can be conveyed in each control word. The control of the array of compute elements on a cycle-by-cycle basis can include configuring the array to perform various compute operations. In embodiments, the stream of wide control words comprises variable length control words generated by the compiler. In embodiments, the stream of wide, variable length control words generated by the compiler provides direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

The system 800 can include a holding component 870. The holding component 870 can include control and functions for holding memory access data before promotion, based on the monitoring. Recall that times critical to parallel processing, such as memory cache access times, crossbar switch transit times, and so on, are unknown to the compiler. Further, the memory cache access times and the crossbar switch transit times are dependent upon whatever mix of memory access operations (e.g., loads and/or stores) is being performed during a given cycle. In embodiments, the unique precedence tag can enable load access priority in the crossbar switch. The precedence information associated with the tagging the memory access operations, and the monitoring of those memory access operations, enable control elements associated with the compute element array to hold memory access data prior to the data being promoted. The promoting can include releasing data from a buffer for loading or storing. The buffers can include one or more access buffers coupled between the memory data cache and the crossbar switch, one or more load buffers coupled between the compute element array and the crossbar switch, etc. The released data can transit the crossbar switch for storing into memory such as a data cache, for loading into one or more buffers associated with compute elements within the array of compute elements, etc. In embodiments, the holding can be accomplished using access buffers coupled to a memory cache. The one or more access buffers can hold load data destined for one or more compute elements within the array; store data destined for the memory cache, and so on. The access buffers can be shared among the compute elements, configured for data storage by a subset of compute elements, etc. In embodiments, the holding can prevent premature data promotion into or out of the memory cache. Premature data promotion into or out of the memory cache can comprise a memory access hazard. As stated previously and throughout, the memory cache can include a data cache for the array of compute elements. The data cache can comprise a multilevel cache such as a level 1 (L1), level 2 (L2), level 3 (L3) cache, etc. The data cache can provide data to and receive data from a storage element such as a scratchpad memory coupled to a compute element within the array.

Mentioned previously, memory access data can be held before promotion in order to avoid memory access hazards such as load hazards and store hazards. The holding memory access data can include delaying the promoting of data. Further embodiments can include delaying the promoting of data to the access buffer and/or the releasing of data from the access buffer. The delaying can be based on a number of cycles; an indication such as a flag, semaphore, or signal; etc. In embodiments, the delaying avoids hazards. Further embodiments can include identifying hazardous loads and stores by comparing load and store addresses to contents of an access buffer. A hazard can occur when loads and stores access substantially similar addresses in memory such as data memory cache. A hazardous load or store operation can include loading invalid data, overwriting valid data, and so on. In embodiments, the hazards can include write-after-read, read-after-write, and write-after-write conflicts, etc. Such hazards are particularly acute in parallel processing due to data dependencies between processes, tasks, subtasks; orders of execution of compute element operations; etc. In embodiments, the identifying enables hazard mitigation. The hazard mitigation can include hardware ordering of memory access loads and stores. Further embodiments comprise including the precedence information in the comparison resulting from the comparing. The precedence information can be used to order and coordinate compute element operations executed by compute elements within the array. In embodiments, the precedence information can provide semantically correct operation ordering. Various techniques can be used to accomplish hazard mitigation. In embodiments, the hazard mitigation can include load-to-store forwarding, store-to-load forwarding, store-to-store forwarding, and so on.

Further embodiments include decompressing the plurality of compressed control words. The decompressing the compressed control words can include enabling or disabling individual compute elements, rows or columns of compute elements, regions of compute elements, and so on. The decompressed control words can include one or more compute element operations. Further embodiments include executing operations within the array of compute elements using the plurality of compressed control words that were decompressed. The order in which the operations are executed is critical to successful processing such as parallel processing. In embodiments, the decompressor can operate on compressed control words that were ordered before they are presented to the array of compute elements. The operations that can be performed can include arithmetic operations, Boolean operations, matrix operations, neural network operations, and the like. The operations can be executed based on the control words generated by the compiler. The control words can be provided to a control unit, where the control unit can control the operations of the compute elements within the array of compute elements. Operation of the compute elements can include configuring the compute elements, providing data to the compute elements, routing and ordering results from the compute elements, and so on. In embodiments, the same decompressed control word can be executed on a given cycle across the array of compute elements. The control words can be decompressed to provide control on a per compute element basis, where each control word can be comprised of a plurality of compute element control groups or bunches. One or more control words can be stored in a compressed format within a memory such as a cache. The compression of the control words can greatly reduce storage requirements. In embodiments, the control unit can operate on decompressed control words. The executing operations contained in the control words can include distributed execution of operations. In embodiments, the distributed execution of operations can occur in two or more compute elements within the array of compute elements. Recall that the mapping of the virtual registers can include renaming by the compiler. In embodiments, the renaming can enable the compiler to orchestrate execution of operations using the physical register files.

The system 800 can include a computer program product embodied in a non-transitory computer readable medium for parallel processing, the computer program product comprising code which causes one or more processors to perform operations of: accessing an array of compute elements, wherein each compute element within the array of compute elements is known to a compiler and is coupled to its neighboring compute elements within the array of compute elements; providing control for the compute elements on a cycle-by-cycle basis, wherein control is enabled by a stream of wide control words generated by the compiler; tagging memory access operations with precedence information, wherein the tagging is contained in the control words, and wherein the tagging is provided by the compiler at compile time; monitoring memory access operations, wherein the monitoring is based on the precedence information and a number of architectural cycles of the cycle-by-cycle basis; and holding memory access data before promotion, based on the monitoring.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for parallel processing comprising:
   accessing an array of compute elements, wherein each compute element within the array of compute elements is known to a compiler and is coupled to its neighboring compute elements within the array of compute elements, wherein each compute element is disposed within one or more integrated circuits;
   providing control for the compute elements on a cycle-by-cycle basis, wherein the control is enabled by a stream of control words generated by the compiler;
   tagging memory access operations with precedence information, wherein the tagging is contained in the control words, wherein the tagging includes tagging store accesses with a unique precedence tag, wherein the unique precedence tag is based on a cycle count that includes a number of cycles within which a store access must occur before an out-of-time exception is thrown, and wherein the tagging is provided by the compiler at compile time;
   monitoring the memory access operations, wherein the monitoring is based on the precedence information and a number of architectural cycles of the cycle-by-cycle basis; and
   holding memory access data before promotion, based on the monitoring.

2. The method of claim 1 further comprising augmenting the tagging at run time, based on the monitoring.

3. The method of claim 1 wherein the holding is accomplished using access buffers coupled to a memory cache.

4. The method of claim 3 wherein the holding prevents premature data promotion into or out of the memory cache.

5. The method of claim 3 wherein the memory cache comprises a data cache for the array of compute elements.

6. The method of claim 3 wherein the memory cache has an access time that is unknown to the compiler.

7. The method of claim 3 further comprising transferring the memory access data between the array of compute elements and the access buffers using a crossbar switch.

8. The method of claim 7 wherein a delay for the transferring is unknown to the compiler.

9. The method of claim 7 wherein the unique precedence tag enables load access priority in the crossbar switch.

10. The method of claim 1 wherein the precedence information enables hardware ordering of memory access loads to the array of compute elements and memory access stores from the array of compute elements.

11. The method of claim 10 wherein the precedence information provides semantically correct operation ordering.

12. The method of claim 1 wherein the precedence information comprises intra-control word precedence and inter-control word precedence.

13. The method of claim 1 further comprising identifying hazardous loads and stores by comparing load and store addresses to contents of an access buffer.

14. The method of claim 13 wherein the comparing identifies potential accesses to a same address.

15. The method of claim 13 further comprising including the precedence information in the comparing.

16. The method of claim 13 further comprising delaying promoting of data to the access buffer and releasing of the data from the access buffer.

17. The method of claim 16 wherein the delaying avoids hazards.

18. The method of claim 17 wherein the avoiding the hazards is based on a comparative precedence value.

19. The method of claim 17 wherein the hazards include write-after-read conflicts, read-after-write conflicts, and write-after-write conflicts.

20. The method of claim 13 wherein the identifying enables hazard mitigation.

21. The method of claim 20 wherein the hazard mitigation includes load-to-store forwarding, store-to-load forwarding, and store-to-store forwarding.

22. The method of claim 1 wherein the control words include branch operations.

23. The method of claim 22 further comprising suppressing memory access stores for untaken branch paths.

24. A computer program product embodied in a non-transitory computer readable medium for parallel processing, the computer program product comprising code which causes one or more processors to perform operations of:
   accessing an array of compute elements, wherein each compute element within the array of compute elements is known to a compiler and is coupled to its neighboring compute elements within the array of compute elements, wherein each compute element is disposed within one or more integrated circuits;
   providing control for the compute elements on a cycle-by-cycle basis, wherein the control is enabled by a stream of control words generated by the compiler;
   tagging memory access operations with precedence information, wherein the tagging is contained in the control words, wherein the tagging includes tagging store accesses with a unique precedence tag, wherein the unique precedence tag is based on a cycle count that includes a number of cycles within which a store access must occur before an out-of-time exception is thrown, and wherein the tagging is provided by the compiler at compile time;
   monitoring the memory access operations, wherein the monitoring is based on the precedence information and a number of architectural cycles of the cycle-by-cycle basis; and
   holding memory access data before promotion, based on the monitoring.

25. A computer system for parallel processing comprising:
   a memory which stores instructions;
   one or more processors coupled to the memory, wherein the one or more processors, when executing the instructions which are stored, are configured to:
      access an array of compute elements, wherein each compute element within the array of compute elements is known to a compiler and is coupled to its neighboring compute elements within the array of compute elements, wherein each compute element is disposed within one or more integrated circuits;

provide control for the compute elements on a cycle-by-cycle basis, wherein the control is enabled by a stream of control words generated by the compiler;

tag memory access operations with precedence information, wherein the tagging is contained in the control words, wherein the tagging includes tagging store accesses with a unique precedence tag, wherein the unique precedence tag is based on a cycle count that includes a number of cycles within which a store access must occur before an out-of-time exception is thrown, and wherein the tagging is provided by the compiler at compile time;

monitor the memory access operations, wherein the monitoring is based on the precedence information and a number of architectural cycles of the cycle-by-cycle basis; and hold memory access data before promotion, based on the monitoring.

\* \* \* \* \*